United States Patent
Maskatia et al.

(10) Patent No.: US 9,614,878 B2
(45) Date of Patent: Apr. 4, 2017

(54) SYSTEM AND METHOD FOR PROVIDING SUPPLEMENTAL INFORMATION RELATED TO MEDIA CONTENT

(75) Inventors: Imran Maskatia, Milpitas, CA (US); Jason Rubinstein, Lake Forest, IL (US)

(73) Assignee: REDBOX AUTOMATED RETAIL, LLC, Oakbrook Terrace, IL (US)

( * ) Notice: Subject to any disclaimer, the term of this patent is extended or adjusted under 35 U.S.C. 154(b) by 219 days.

(21) Appl. No.: 13/588,997

(22) Filed: Aug. 17, 2012

(65) Prior Publication Data

US 2013/0227013 A1    Aug. 29, 2013

Related U.S. Application Data

(60) Provisional application No. 61/525,684, filed on Aug. 19, 2011.

(51) Int. Cl.
G06F 15/16    (2006.01)
H04L 29/06    (2006.01)
(Continued)

(52) U.S. Cl.
CPC .......... *H04L 65/403* (2013.01); *G06Q 30/02* (2013.01); *G06Q 30/0601* (2013.01); *G06Q 30/0645* (2013.01); *H04N 21/25891* (2013.01); *H04N 21/4104* (2013.01); *H04N 21/4126* (2013.01); *H04N 21/42684* (2013.01);
(Continued)

(58) Field of Classification Search
USPC .................................................. 709/204, 217
See application file for complete search history.

(56) References Cited

U.S. PATENT DOCUMENTS 7,234,609 B2    6/2007   DeLazzer et al.
8,359,399 B2 *  1/2013   Landow ................. H04L 67/02
                                                         709/231
(Continued)

FOREIGN PATENT DOCUMENTS

WO         2013028578 A1    2/2013

OTHER PUBLICATIONS

International Search Report and Written Opinion for PCT Application No. PCT/US2012/051498 mailed Jan. 2, 2013.

*Primary Examiner* — Joseph E Avellino
*Assistant Examiner* — Marshall McLeod
(74) *Attorney, Agent, or Firm* — James P. Muraff; Neal, Gerber & Eisenberg LLP

(57) ABSTRACT

A method of providing supplemental information synchronized with a piece of media content being played and related to a current state of the piece of media content being played is provided. The supplemental information may be transmitted to an electronic device in synchronization with the playing of the piece of media content on an audio/visual display interface. The method includes receiving identifying information from the electronic device and/or the audio/visual display interface, storing the identifying information in an active device table, receiving a viewing initiation notification, and transmitting the supplemental information to the electronic device in response to the viewing initiation notification. The electronic device may also transmit a request to begin playing the piece of media content. Transmission of the supplemental information may be paused, stopped, or resumed in synchronization with the piece of media content being played.

27 Claims, 12 Drawing Sheets

(51) Int. Cl.

| | |
|---|---|
| *G06Q 30/02* | (2012.01) |
| *G06Q 30/06* | (2012.01) |
| *H04N 21/41* | (2011.01) |
| *H04N 21/258* | (2011.01) |
| *H04N 21/426* | (2011.01) |
| *H04N 21/43* | (2011.01) |
| *H04N 21/462* | (2011.01) |
| *H04N 21/84* | (2011.01) |
| *H04N 21/845* | (2011.01) |

(52) U.S. Cl.
CPC ..... *H04N 21/4307* (2013.01); *H04N 21/4622* (2013.01); *H04N 21/84* (2013.01); *H04N 21/8455* (2013.01)

(56) References Cited

U.S. PATENT DOCUMENTS

| | | | |
|---|---|---|---|
| 2005/0198574 A1* | 9/2005 | Lamkin | G06F 21/10 715/719 |
| 2006/0026162 A1 | 2/2006 | Salmonsen | |
| 2006/0265427 A1* | 11/2006 | Cohen | G06F 17/30038 |
| 2008/0222690 A1 | 9/2008 | Kim | |
| 2010/0036808 A1 | 2/2010 | Lee | |
| 2010/0153983 A1 | 6/2010 | Philmon et al. | |
| 2011/0225417 A1* | 9/2011 | Maharajh | G06F 21/10 713/150 |
| 2012/0210340 A1* | 8/2012 | Reynolds | H04N 21/2543 725/23 |
| 2012/0266200 A1* | 10/2012 | Dasher | H04N 21/2396 725/93 |

\* cited by examiner

SYSTEM AND METHOD FOR PROVIDING SUPPLEMENTAL INFORMATION RELATED TO MEDIA CONTENT

CROSS-REFERENCE TO RELATED APPLICATIONS

This application claims priority to U.S. Provisional Application No. 61/525,684, filed Aug. 19, 2011, entitled "SYSTEM AND METHOD FOR PROVIDING SUPPLEMENTAL INFORMATION RELATED TO MEDIA CONTENT", and is incorporated herein by reference in its entirety.

TECHNICAL FIELD

This invention relates to a system and method for providing supplemental information related to media content. More particularly, the present invention provides a system and method for transmitting supplemental information to an electronic device, where the supplemental information is synchronized with a piece of media content being played and is related to a current state of the piece of media content being played.

BACKGROUND AND SUMMARY OF THE INVENTION

While the present invention is often described herein with reference to a digital video disc, Blu-Ray disc, and video game distribution system, an application to which the present invention is advantageously suited, it will be readily apparent that the present invention is not limited to that application and can be employed in article dispensing systems used to distribute a wide variety of dispensable articles.

The digital video disc (DVD) player has been one of the most successful consumer electronics product launches in history. The market for DVD movie video, Blu-Ray movie video, and video game rentals is enormous and growing. Millions of households have acquired DVDs since they were introduced in 1997. In the first quarter of 2003 alone, it was estimated that well over three million DVD players were shipped to U.S. retailers.

In 2003, brick-and-mortar stores dominated the movie video and video game rental landscape in the U.S. Statistics showed that two brick-and-mortar companies controlled nearly sixty-five percent of the home video rental business. One element repeatedly cited for success of certain brick-and mortar store video rental franchises was perceived high availability of new video releases. Consumers want entertainment on demand, and through stocking multiple units of each new release, successful brick-and-mortar companies meet this consumer demand.

The foregoing indicates that there is a significant market potential for aligning regular routines of consumers (e.g., shopping, getting coffee or gas or going to a convenience store) with their DVD, Blu-Ray, and video game rental activities.

One improved article dispensing machine is disclosed in commonly owned U.S. Pat. No. 7,234,609, which is herein incorporated by reference in its entirety. The invention of the U.S. Pat. No. 7,234,609 and the present invention can function as an article dispensing machine-based distribution system that will typically have multiple units of each new release per article dispensing machine. The dispensing machines of the U.S. Pat. No. 7,234,609 and the present invention can stock up to two thousand DVDs, Blu-Ray, video games, or other discs (movies, games or other entertainment content), making the system competitive with existing brick-and-mortar video rental superstores.

The dispensing machine and system of the U.S. Pat. No. 7,234,609 and the present invention distinguishes itself from such stores by offering major benefits not conventionally offered by such stores, including additional cross-marketing programs (e.g., promotional rentals for a certain amount of dollars spent at the retail location) and convenience (e.g., open always).

The dispensing machine of the U.S. Pat. No. 7,234,609 and the present invention yields a competitive advantage in the DVD, Blu-Ray disc, and video game rental marketplace by offering consumers cross-marketing/promotional programs, convenience of selection (e.g., computer-based searches for movies and recommendations based on consumer profiles), and potentially extended hours. The present invention employs a more cost-effective, convenient platform than brick-and-mortar stores. In addition, with the present invention, dispensing machines can be situated in retail locations having high foot traffic, such as at a popular grocery store, restaurant, drug store, and/or other popular retail location.

The dispensing machine of the U.S. Pat. No. 7,234,609 and the present invention can be operated at a substantial savings over the costs associated with traditional brick-and-mortar video rental stores. For example, the present invention does not require hourly employees manning the dispensing machines or restocking them with inventories, due to the ability of the article transport storage units to be delivered to/picked up from retail locations by third-party delivery services, such as traditional or contracted courier services.

Unlike brick-and-mortar stores, the dispensing machine of the U.S. Pat. No. 7,234,609 and the present invention does not require an on-site store manager because all operational decisions can be made at a centralized location by a management team officed remote from the retail locations. Unlike brick-and-mortar stores, the dispensing machine of the U.S. Pat. No. 7,234,609 and the present invention does not require significant physical space. Unlike brick-and-mortar stores, the dispensing machine of the U.S. Pat. No. 7,234,609 and the present invention has low operating costs because no heating or air conditioning is required for the dispensing machines and they consume a relatively low level of electrical energy. In addition, the dispensing machine of the U.S. Pat. No. 7,234,609 has low maintenance costs and downtime.

The dispensing machine of the U.S. Pat. No. 7,234,609 and the present invention addresses the shortcomings of traditional brick-and-mortar stores in a convenient and cost-effective delivery vehicle having the added bonus of serving as an effective promotional platform that drives incremental sales to retail locations. In addition, the dispensing machine of the U.S. Pat. No. 7,234,609 and the present invention overcomes these disadvantages by at least offering more new releases and older selections for any given time period, and lower cost per viewing with significantly more convenience than Internet-based and pay-per-view services.

The dispensing machine of the U.S. Pat. No. 7,234,609 and the present invention is a fully automated, integrated DVD, Blu-Ray, and video game rental and/or purchase systems. It preferably incorporates robust, secure, scalable software that provides a fully personalized user experience and real-time feedback to retail locations and advertisers, scalable hardware that leverages existing technologies such as touch screen, focused audio speakers and video monitors, technology utilizing the Internet through a system website or mobile/consumer electronics device application, and an article transport storage unit that facilitates the exchange of new discs for old discs in each machine with virtually no need for human intervention. These technologies and others fill long-felt needs in the art and give advantages over conventional video distribution options. The dispensing machine of the U.S. Pat. No. 7,234,609 and the present invention functions as much as a promotional platform as it does a rental kiosk.

By utilizing the dispensing machines and the fully-interactive, real-time, linked Internet website or mobile/consumer electronics device applications, consumers can rent one or more DVDs, Blu-Ray discs, video games, or other entertainment content directly from dispensing machines as well as indirectly by making a rental reservation through the website or application for later pickup at a conveniently located machine. These dispensing machines are preferably networked with each other, with the inventory control and/or supply office and with the system website or application by phone-line, DSL, wireless network, or other Internet connection at each retail location. Through this linked network, the rental experience for each consumer can be customized based on a profile for each consumer, such as via personalized home pages and rental screens.

Existing systems may provide access on an electronic device to bonus material related to a movie on a DVD or Blu-Ray disc, such as deleted scenes, trailers, and director commentary. However, the bonus material accessible on the electronic device is the same as the bonus material that already exists on the disc containing the movie. A user may access the bonus material on the electronic device but the bonus material is not synchronized to a viewing of the movie. In addition, the bonus material is limited to the static content on the DVD or Blu-Ray disc. Moreover, other existing systems may provide information related to a piece of media content on the same screen that is displaying the piece of media content. For example, an offer to purchase a product that is being shown in a movie could be displayed on a television screen that is also displaying the movie. However, information that is displayed on the screen may be displeasing to a viewer because of the distraction and clutter that the information creates on the screen.

The present invention allows for providing supplemental information related to a piece of media content to an electronic device. The supplemental information can be synchronized to the piece of media content and can be related to a current state of the piece of media content. The supplemental information may be transmitted to the electronic device automatically in response to the start of play of the piece of media content on an audio/visual display interface. Alternately, a user can manually start transmission of the supplemental information by simultaneously indicating that playing of the piece of media content has begun. Playing the piece of media content may also be requested by a user through the electronic device. The present invention overcomes disadvantages of existing systems by providing supplemental information that is not necessarily already available and by transmitting the supplemental information to an electronic device separate from the audio/visual display interface that is displaying the piece of media content. Moreover, the present invention transmits the supplemental information in synchronization with the piece of media content being played, and ensures that the supplemental information is related to a current state of the piece of media content. Other features and advantages are provided by the following description and drawings.

DETAILED DESCRIPTION OF THE INVENTION

Figure 1:
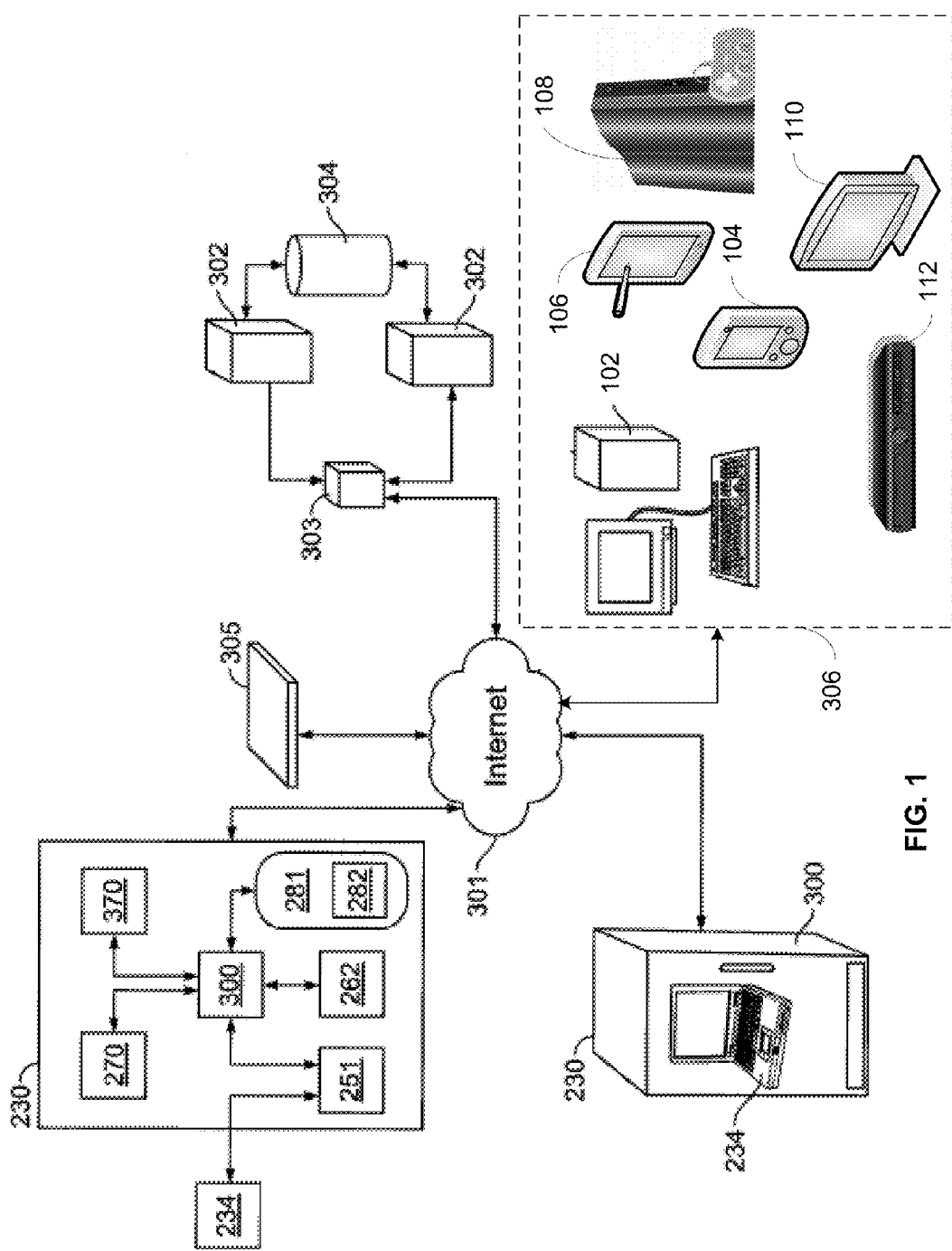
FIG. 1 is an illustration of a system for communicating and processing information in a network of article dispensing machines and dispensing apparatus.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
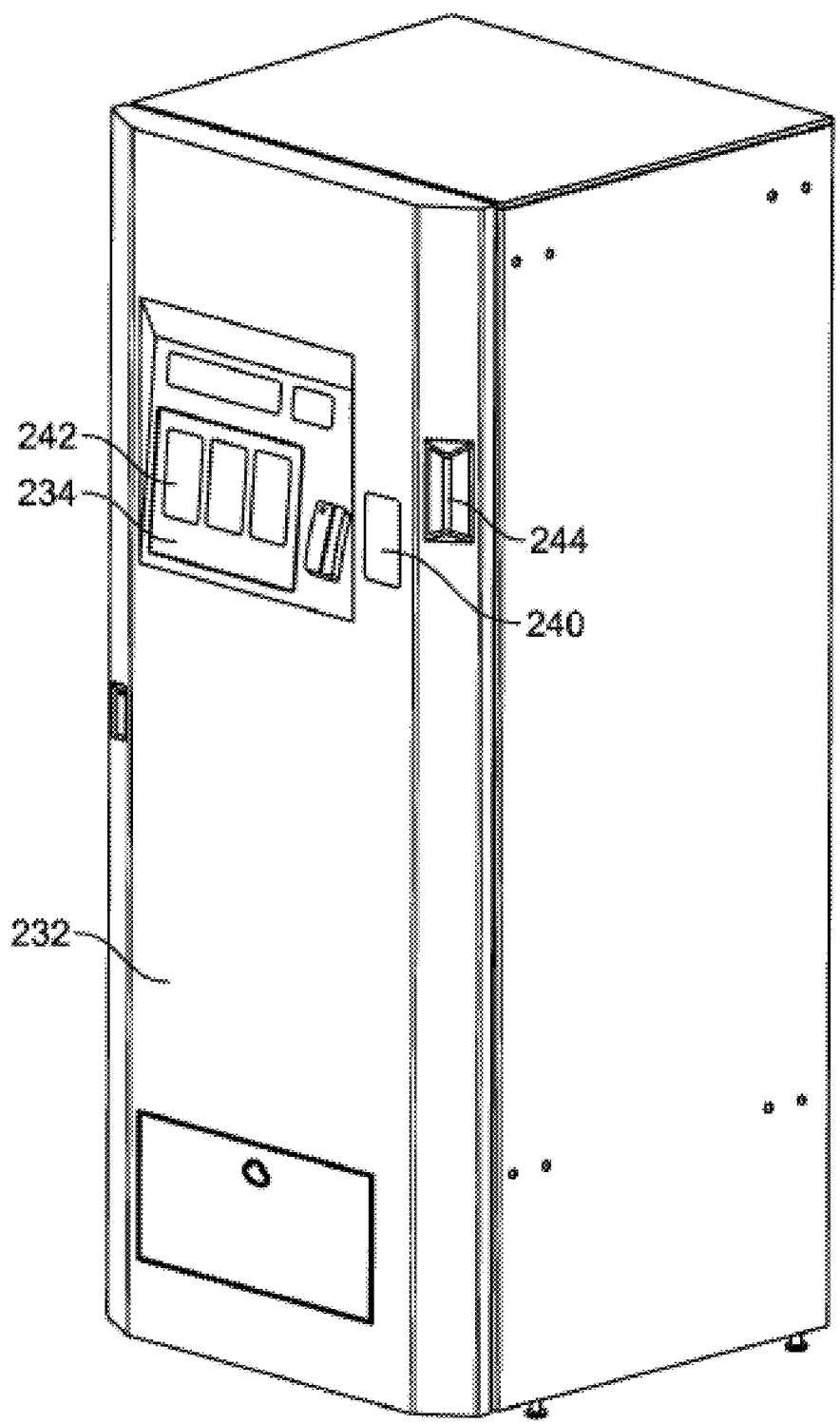
FIG. 2 is a perspective view of an article dispensing machine constructed in accordance with the principles of the present invention.

FIGS. 1-2 illustrate an article dispensing machine designated 230. Article dispensing machine 230 is one of a plurality of article dispensing machines included within an article distribution system having a plurality of such machines situated at a plurality of retail locations. The article dispensing machines of a particular article distribution system preferably form a network. As such, those machines are preferably in electrical communication with each other and with a central server or central controller.

As shown in FIG. 1, each article dispensing machine 230 includes a dispensing machine processor 300, also referred to herein as a vending controller, which is connected to a first sensor 270 and a second sensor 370, a first motor 251 and a second motor 262 and a user interface control system 234, collectively referred to as "the peripheral devices." The processor is capable of executing various programs to provide input to and/or receive outputs from the peripheral devices. Suitable processors for such use are known to those of skill in the art. In addition, the processor is operably connected to at least one memory storage device 281, such as a hard-drive or flash-drive or other suitable memory storage device.

Article dispensing machine memory storage device 281 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, article dispensing machine memory storage device 281 may incorporate electronic, magnetic, optical, and/or other types of storage media. Article dispensing machine memory storage device 281 can have a distributed architecture where various components are situated remote from one another, but are still accessed by processor. Article dispensing machine memory storage device includes an article dispensing machine database 282.

The article dispensing machines 230 preferably comprise a network of machines in communication with one another. As shown in FIG. 1, in the preferred configuration, the article dispensing machines 230 are networked with one another via a central server or central controller 302 in a hub-and-spoke system. However, optionally, the article dispensing machines may be connected and communicate directly with one another, and/or subsets of article dispensing machines may communicate with one another directly as well as with the central server 302.

Figure 3:
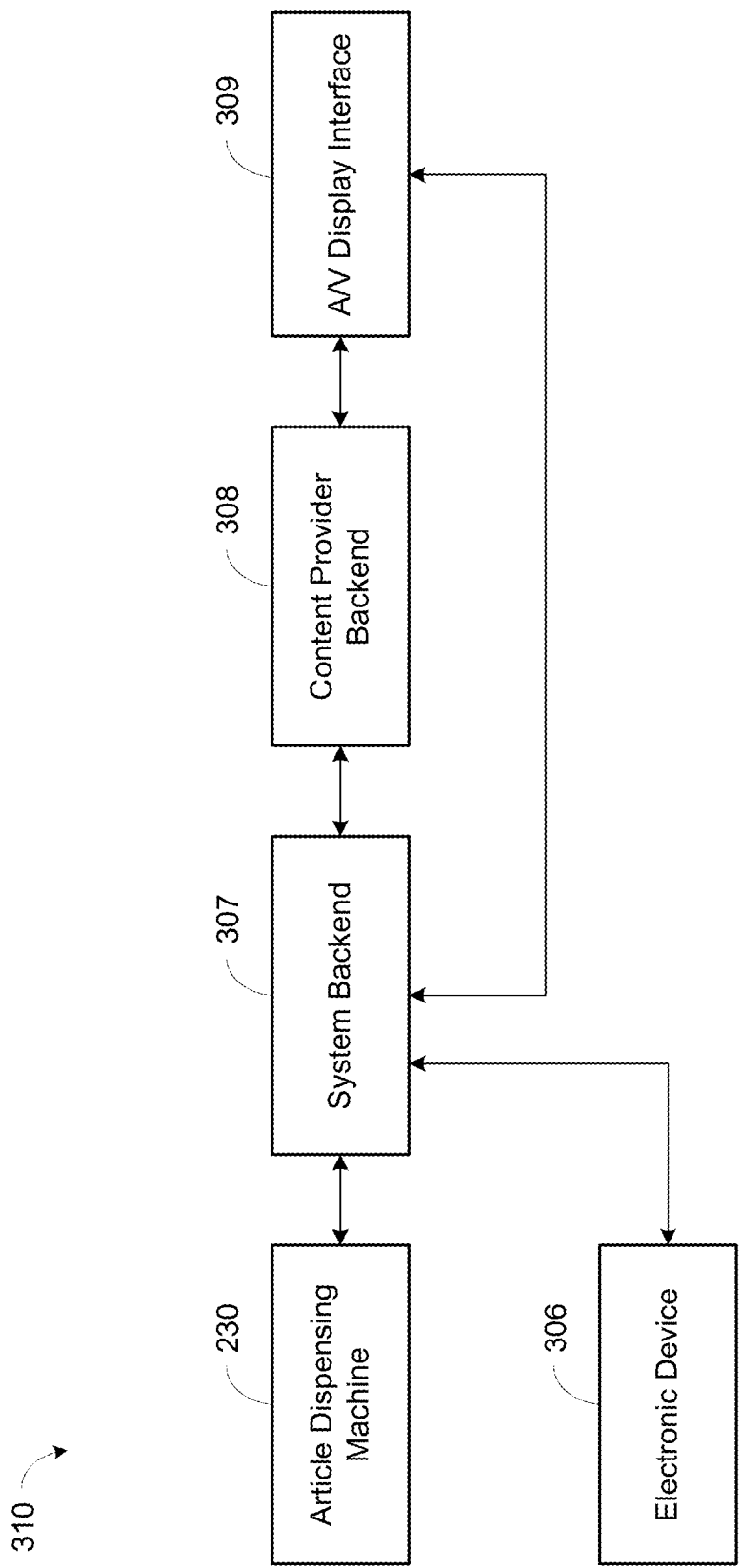
FIG. 3 is a high-level block diagram illustrating a networked media content system and connections including an article dispensing machine, a system backend, a content provider backend, an A/V display interface, and an electronic device.

Generally, in terms of hardware architecture, the central server 302 and the content provider backend 308 shown in FIG. 3 include a central processor and/or controller, central memory, and one or more input and/or output (I/O) devices (or peripherals) that are communicatively coupled via a local interface. The architecture of the central server 302 is set forth in greater detail in U.S. Pat. No. 7,234,609, the contents of which are incorporated herein by reference. Numerous variations of the architecture of the central server 302 and the content provider backend 308 would be understood by one of skill in the art and are encompassed within the scope of the present invention.

The processor/controller is a hardware device for executing software, particularly software stored in memory. The processor can be any custom made or commercially available processor, a central processing unit (CPU), an auxiliary processor among several processors associated with the server 302, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc., or a 68xxx series microprocessor from Motorola Corporation. The processor may also represent a distributed processing architecture such as, but not limited to, SQL, Smalltalk, APL, KLisp, Snobol, Developer 200, MUMPS/Magic.

The software in memory may include one or more separate programs. The separate programs comprise ordered listings of executable instructions for implementing logical functions. The software in memory includes a suitable operating system (O/S). A non-exhaustive list of examples of suitable commercially available operating systems is as follows: (a) a Windows operating system available from Microsoft Corporation; (b) a Netware operating system available from Novell, Inc.; (c) a Macintosh operating system available from Apple Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers, smartphones, or personal digital assistants (PDAs) (e.g., PalmOS available from Palm Computing, Inc., Windows CE or Windows Phone available from Microsoft Corporation, iOS available from Apple Inc, Android available from Google Inc., BlackBerry OS available from Research in Motion Limited, Symbian available from Nokia Corp.). The operating system essentially controls the execution of other computer programs and provides scheduling, input-output control, file and data management, memory management, and communication control and related services.

Steps and/or elements, and/or portions thereof of the present invention may be implemented using a source program, executable program (object code), script, or any other entity comprising a set of instructions to be performed. When a source program, the program needs to be translated via a compiler, assembler, interpreter, or the like, which may or may not be included within the memory, so as to operate properly in connection with the operating system (O/S). Furthermore, the software embodying the present invention can be written as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, Ada, and Lua.

When article dispensing machine 230 is in operation, the article dispensing machine processor is configured to execute software stored within article dispensing machine memory, to communicate data to and from the dispensing machine memory, and to generally control operations of article dispensing machine pursuant to the software. The software aspects of the present invention and the O/S, in whole or in part, but typically the latter, are read by processor, perhaps buffered within the processor, and then executed.

When the present invention or aspects thereof are implemented in software, it should be noted that the software can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The present invention can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

For communication with the central server 302, article dispensing machine 230 is equipped with network communication equipment and circuitry. In a preferred embodiment, the network communication equipment includes a network card such as an Ethernet card. In a preferred network environment, each of the plurality of article dispensing machines 230 on the network is configured to use the TCP/IP protocol to communicate via the network 301. It will be understood, however, that a variety of network protocols could also be employed, such as IPX/SPX, Netware, PPP and others. It will also be understood that while a preferred embodiment of the present invention is for article dispensing machine 230 to have a "broadband" connection to the network 301, the principles of the present invention are also practicable with a dialup connection using a standard modem. Wireless network connections are also contemplated, such as wireless Ethernet, satellite, infrared, radio frequency, Bluetooth, near field communication, and cellular networks.

The central controller 302 communicates with the article dispensing machine controllers 300 via the network 301. The central controller 302 is preferably located at a central station or office that is remote from the plurality of article dispensing machines 230. The central controller 302 can operate as the server for communicating over the network 301 between the plurality of article dispensing machines 230. The central controller 302 receives communications and information from the article dispensing machines 230, and also transmits communications and information to the machines 230. For example, when a rental transaction is performed at the article dispensing machine 230, transaction data such as the rented title is then transmitted from the machine 230 to the central controller 302 via the network 301. It will be understood that central servers in general, such as the central controller 302, are often distributed. A plurality of central servers/controllers 302 may optionally be arranged in "load balanced" architecture to improve the speed and efficiency of the network. To accomplish the implementation of multiple controllers 302, the controllers 302 may be in communication with a router/distributor 303.

The central controller 302 is also in communication with a central database 304. The central database 304 stores information regarding the transaction network. For example, the central database 304 stores data regarding the vending inventory at each of the plurality of article dispensing machines 230. The central database 304 also stores sales information regarding the sales quantities of the vending merchandise stored in the machines 230. For example, the central database 304 stores information regarding the sales totals for each title and for each machine 230 vending location. Central database 304 also stores user information and rental transaction information, such as user IDs, the date on which discs are due to be returned, the date on which discs were rented from the machines 230 and a list of valid coupon codes and restrictions associated with those codes. In certain embodiments, central database 304 also may be configured to store user PINs. Some of this information is also preferably stored in article dispensing machine database 282.

Central database 304 and databases in the content provider backend 308, such as the content provider customer profile database 502 and other databases, are preferably relational databases, although other types of database architectures may be used without departing from the principles of the present invention. For example, the databases 304 and 502 may be a SQL database, an Access database or an Oracle database, and in any such embodiment have the functionality stored herein. Central database 304 is also preferably capable of being shared, as illustrated, between a plurality of central controllers 302 and its information is also preferably capable of being transmitted via network 301. It will be understood that a variety of methods exist for serving the information stored in central database 304 and database 502. In one embodiment, .net and Microsoft Reporting Services are employed, however, other technologies such as ODBC, MySQL, CFML and the like may be used.

The central controller 302, central database 304, and components of the content provider backend 308 are also accessible by an electronic device 306, which may include a personal computer 102, mobile device 104 (e.g., smartphone, personal digital assistant, etc.), tablet computer 106, video game console 108, television 110, and Blu-Ray player 112. The electronic device 306 may be in direct or indirect communication with the central controller 302, central database 304, and/or the content provider backend 308 through a wired and/or wireless network connection, such as Ethernet, Wi-Fi, cellular (3G, 4G, etc.), or other type of connection. As a personal computer 102, the electronic device 306 will be understood as comprising hardware and software consistent with marketable personal and laptop computers, such as a display monitor, a keyboard, and a microprocessor. The electronic device 306 may also comprise Internet browser software such as Firefox, Internet Explorer, Chrome, or Safari. Using the browser software, a user of the electronic device 306 can access a web interface through the central controller 302. An application may also execute on the electronic device 306 that accesses the central controller 302. To that end, central controller 302 preferably comprises web server software such as IIS or Apache. It will be understood that a variety of web server software and web browser software exists to implement the principles of the present invention without departing therefrom. Through the web browser software or application, the electronic device 306 communicates with the central controller 302 and allows the user to login to a central command functionality of the central controller 302 and to view and modify data stored in the central database 304. The browser interface or application also allows the user to perform certain system functions, which will affect the inventory and behavior of the article dispensing machines 230. The electronic device 306 may communicate with the central controller 302, central database 304, components of the system backend 307, and components of the content provider backend 308 using rules and specifications of an application programming interface (API).

In a preferred embodiment, a financial server 305 is also in communication with the network 301. It will be understood that a variety of financial services exist for processing financial information via the Internet and other networks 301. Those services allow for the processing of credit card and debit card information, so that users of the services do not have to interface directly with credit and debit card companies. In FIG. 1, the financial server 305 is illustrated as a single server, although the financial server 305 may comprise an entire sub-network of financial servers 305 responsible for processing financial information.

As shown in FIG. 2, article dispensing machine 230 includes a machine housing 232 with front, rear, top, bottom and side panels. The machine housing 232 is preferably a combination molded fiberglass and sheet metal cabinet. However, those skilled in the art will appreciate that the housing can be constructed from a variety of other suitable materials and with a variety of other suitable manufacturing techniques.

As shown most clearly in FIG. 2, a user interface portion 234 of housing 232 includes a card reader 240, a keypad and/or touch screen 242 and an article transfer opening 244. The card reader 240 is preferably designed in known fashion to read magnetically encoded membership and/or credit/debit cards for authorizing the distribution of articles of inventory through the article transfer opening 244. Keypad and/or touch screen 242 permits consumers and/or inventory stocking personnel to communicate with the dispensing machine 230 and/or a central office linked in electrical communication with the dispensing machine. Keypad and/or touch screen 242 also permits consumers and/or inventory stocking personnel to enter appropriate commands directed to carrying out specific machine tasks. It will be appreciated that the optional touch screen includes a monitor made with known technologies making it capable of being utilized as a user interface for entry of commands designed to carry out machine tasks. The touch screen 242 may also be capable of displaying a QR (Quick Response) code to a customer. The customer may read the QR code with a camera on a mobile device or with a dedicated QR code reader. The QR code can represent a universal resource locator (URL) to access a digital media selection, for example.

Furthermore, it will be appreciated that additional user interface portions having additional or even identical user interface components could be incorporated within article dispensing machine 230. For example, these components could be incorporated on other panels of the housing 232 of machine 230 so that the machine can be used simultaneously by multiple consumers, translating into more efficient distribution of articles in high traffic areas. Dispensing machine 230 also preferably includes speaker units. Known audio technology may be incorporated within dispensing machine 230 to broadcast focused audio directed to relatively small (e.g., three square feet) locations in front of the machines from speaker units and/or in other designated locations at a retail site.

FIG. 3 illustrates a networked media content system 310 including an article dispensing machine 230, an electronic device 306, a system backend 307, a content provider backend 308, and an audio/visual (A/V) display interface 309. The networked media content system 310 provides for a variety of processes involving management, manipulation, searching, presentation, and notification related to digital media content and vendible physical media articles, including processes related to the present invention. The networked media content system 310 allows for direct and indirect communication between the components in the networked media content system 310 via one or more networks. The components in the networked media content system 310 may be operated by one or more entities. In one embodiment, the article dispensing machine(s) 230 and the system backend 307 are operated by a first entity, such as the operator of the article dispensing machines, while the content provider backend 308 and the A/V display interface 309 are operated by a second entity, such as a content provider.

In another embodiment, all of the components shown in the networked media content system 310 of FIG. 3 are operated by the same entity. The physical media article may include at least a DVD, Blu-Ray disc, video game disc, or other media article including those that are out-of-stock or otherwise unavailable for rental. The digital media selections may include streaming video content, video-on-demand content, downloadable video content, streaming video games, downloadable video games, or other digital media content. Streaming or downloadable video games may include content related to video games, such as expansion packs and add-on packs. Although FIG. 3 shows a single electronic device 306, a single content provider backend 308, and a single A/V display interface 309, it is contemplated that more than one electronic device, content provider backend, and/or A/V display interface may be in communication with the system backend 307.

The system backend 307 includes components that primarily communicate information, such as transaction and inventory data, to and from the article dispensing machines 230. Components in the system backend 307 also communicate information to and from the electronic device 306, the content provider backend 308, and the A/V display interface 309. The system backend 307 is detailed below with reference to FIG. 4. The content provider backend 308 includes components that primarily communicate information to and from the A/V display interface 309. Components in the content provider backend 308 also communicate information to and from the system backend 307, as detailed further below. Data communicated between the article dispensing machines 230, the electronic device 306, the system backend 307, the content provider backend 308, and/or the A/V display interface 309 may utilize the XML (Extensible Markup Language) format. The electronic device 306 and the A/V display interface 309 may communicate with the system backend 307 and/or the content provider backend 308 using rules and specifications of an application programming interface (API).

The A/V display interface 309 can be a set-top box, a module of an internet-ready television, a Blu-Ray player with internet connectability, a software application executing on a mobile device, cable television converter box, satellite television set-top box, IPTV (Internet Protocol television) set-top box (including AT&T U-Verse), digital video recorder, tablet computer, video game console (including Microsoft Xbox family, Sony PlayStation family, Nintendo Wii, and similar devices), handheld gaming device (including Sony PlayStation Portable, Nintendo DS, and similar devices), laptop computer, desktop computer, streaming media box (including Apple TV, Google TV, Roku, Boxee, and similar devices), or any other device capable of receiving and displaying streaming, on-demand, and/or downloadable electronic media from a content provider. Moreover, applications may be installed and executed on the A/V display interface 309 that communicate with the system backend 307 and/or the content provider backend 308 to provide media content and other information to a user of the A/V display interface 309. Applications may also be installed and executed on the electronic device 306 that communicate with the system backend 307.

The article dispensing machines 230 can communicate with the system backend 307, including the central server and controller 302, via network communication equipment and circuitry, as detailed above. Furthermore, the system backend 307 can communicate with the content provider backend 308 and the A/V display interface 309 via the same or different network communication equipment and circuitry. The electronic device 306, detailed above, may also be in communication with components of the system backend 307 via the same or different network communication equipment and circuitry. In particular, the system backend 307 can directly communicate with the electronic device 306, the content provider backend 308, the A/V display interface 309, or in one embodiment, the system backend 307 can communicate with the A/V display interface 309 through the content provider backend 308. It will also be understood that while a preferred embodiment of the present invention is for the components of the system 310 to have a "broadband" connection with one another, the principles of the present invention are also practicable with a dialup connection using a standard modem. Wireless network connections are also contemplated, such as wireless Ethernet, satellite, infrared, radio frequency, Bluetooth, near field communication, and cellular networks.

Each of the article dispensing machines 230 may operate without requiring continuous connectivity and communication with the central controller 302. In one embodiment, the central controller 302 only transmits data in response to communication from an article dispensing machine 230. For example, an article dispensing machine 230 may attempt to communicate with the central controller 302 following completion of one or more rental transactions or one or more media article return transactions. In another embodiment, the article dispensing machine 230 continues normal operations and transactions even if communication is interrupted or cannot be established with the central controller 302. In these cases, transaction data can be stored locally in the article dispensing machine 230, such as in the article dispensing machine memory storage device 281, until a predetermined time interval elapses, when a predetermined number of transactions is reached, or until communication with the central controller 302 can be reestablished. Once communication is established with the central controller 302, financial and inventory information can be uploaded and the appropriate servers and databases can be updated.

In one embodiment, the article dispensing machine 230 can display only media articles which are physically located at the article dispensing machine 230. In this way, a customer may browse on the user interface 234 only the media articles which are in-stock and available to rent at that article dispensing machine 230. Typically, the article dispensing machine 230 possesses media information for the media articles that are currently located in the article dispensing machine 230. The media information for a media article includes title, actor, director, studio, publisher, plot synopsis, format, description, parental rating, individualized ratings and reviews, popularity, article type, running time, genre, cover artwork, or other information. The article dispensing machine 230 can also store in memory the media information for recently-rented media articles that are no longer physically stored in the article dispensing machine 230. The article dispensing machine 230 can communicate with the central controller 302 when media information about a particular media article is needed. For example, when a particular media article is returned to an article dispensing machine 230 that does not have the corresponding media information for that particular media article, the article dispensing machine 230 can query the central controller 302, metadata database 410, and/or inventory database 412 for the media information. Once the media information is obtained, the article dispensing machine 230 may display that particular media article on the user interface 234 as in-stock and available to rent.

In another embodiment, the article dispensing machine 230 can display media articles that are both physically located and not physically located at the article dispensing machine 230. In this embodiment, media articles which are both available and unavailable to rent can be displayed. A media article may be unavailable to rent if it is not in-stock or is in-stock but has been reserved for rental. In one example, the entire catalog of media articles stored in the inventory database 412 can be displayed on the article dispensing machine 230. In another example, a subset of the entire catalog of media articles can be displayed on the article dispensing machine 230. The subset of media articles that can be displayed on the article dispensing machine 230 may be determined, for example, based on geographic location, retailer agreements, contractual obligations, customer rental habits, and other criteria. The media articles that can be displayed on the article dispensing machine 230 may include recently-rented media articles that are no longer physically stored in the article dispensing machine 230 or media articles that have never been physically in the article dispensing machine 230. For example, media articles that have never been physically in the article dispensing machine 230 may be displayed because those media articles may be available at a nearby article dispensing machine. In this case, those media articles may be displayed to the customer so that the customer has an option to obtain those media articles from the nearby article dispensing machine 230. In this embodiment, if a customer attempts to rent a media article that is out-of-stock, reserved for another customer, or otherwise cannot be vended at the particular article dispensing machine 230, then that media article can be deemed an unavailable media article. Although a physical unavailable media article cannot be rented from the particular article dispensing machine 230, a digital alternative media selection may be available and substituted for the unavailable media article.

Figure 4:
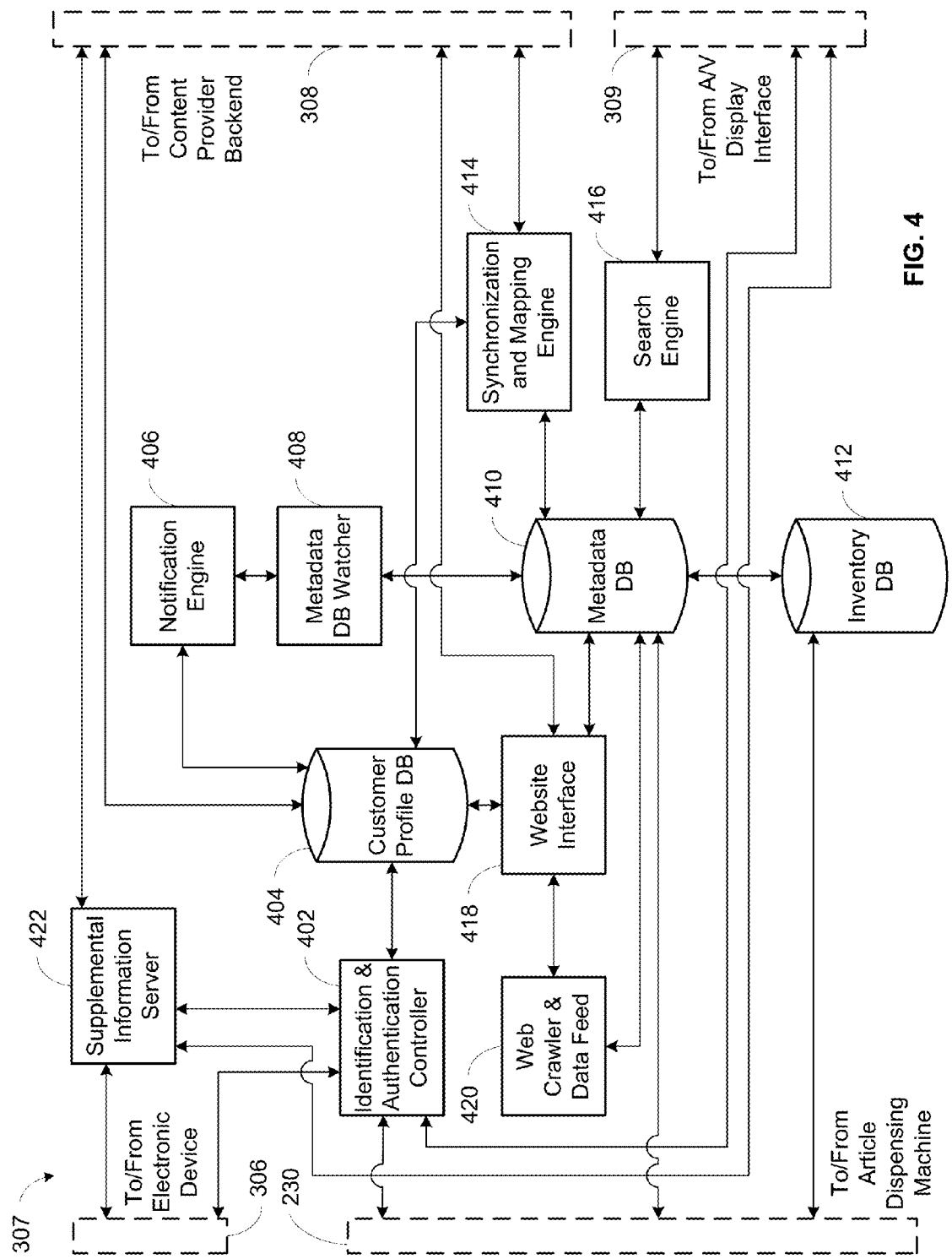
FIG. 4 is a block diagram illustrating the system backend.

FIG. 4 is a block diagram illustrating the system backend 307 and connections to and from the system backend 307 to the article dispensing machines 230, the electronic device 306, the content provider backend 308, and the A/V display interface 309. The system backend 307 includes components that provide and receive data to and from the article dispensing machines 230 during DVD, Blu-Ray disc, and video game rental transactions and other transactions. Components in the system backend 307 are utilized in relation to the present invention, as described below. It will be understood that components 402, 404, 406, 408, 414, 416, 418, 420, and 422 in the system backend 307 may be implemented, for example, by the central controller 302 using instructions stored in a memory connected to the central controller 302. It will be further understood that the databases 404, 410, and 412 may be implemented as part of the central database 304 or as separate databases.

The identification and authentication controller 402 can receive a unique customer identifier that a customer provides to the article dispensing machines 230 during a rental transaction. The unique customer identifier can be a credit or debit card number, a hashed version of a credit or debit card number, or other unique identifier used for payment and/or identification purposes. In the case of hashing of the credit or debit card number, the hash function applied to the credit or debit card number is preferably implemented on the article dispensing machines 230 and may be, for example, a SHA-256 hashing algorithm. The identification and authentication controller 402 can validate the payment capability of a credit or debit card by communicating with the financial server 305.

Figure 5:
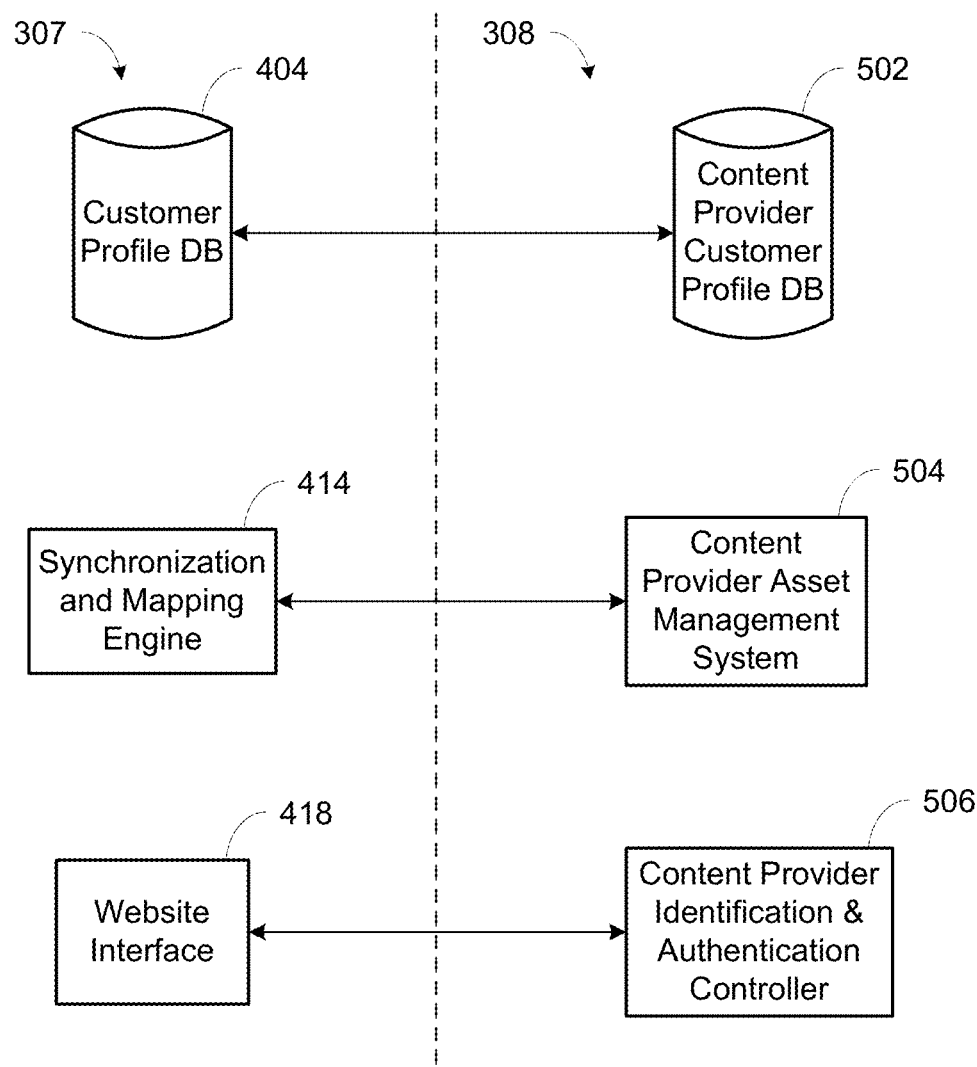
FIG. 5 is a block diagram illustrating connections between the system backend and the content provider backend.

A customer may be authenticated to multiple customer profiles and accounts by the identification and authentication controller 402. The unique customer identifier provided by the customer can authenticate the customer to an existing customer profile and account for the article dispensing machines 230. The existing customer profile and account can be stored and looked up using the unique customer identifier in the customer profile database 404 that is connected to the identification and authentication controller 402. The unique customer identifier can also link the existing customer account to a content provider customer account via a connection from the customer profile database 404 to the content provider customer profile database 502 in the content provider backend 308, as shown in FIG. 5. Zero, one, or more content provider customer accounts may be linked in the customer profile database 404 to the existing customer account for the article dispensing machines 230. A content provider may include, but is not limited to, a cable television operator, a satellite television service provider, an IPTV (Internet Protocol television) provider, an online gaming and digital media delivery service (Xbox Live, PlayStation Network, OnLive, etc.), a website (YouTube, Hulu, etc.), a movie studio, a television network, a game publisher, or a retailer (Best Buy, Walmart, etc.). Media selections available from a content provider may include videos on demand, streaming videos, downloadable videos, streaming video games, or downloadable video games. The media selections may be available through the A/V display interface 309 that is in communication with the content provider backend 308.

A user may also provide identifying information, including a unique customer identifier, to an electronic device 306 and/or an A/V display interface 309 for initiating the transmission of supplemental information to the electronic device 306. The supplemental information may be synchronized and related to a piece of media content being played and is described in more detail below. The identifying information can be received by the identification and authentication controller 402. As described above, the unique customer identifier can authenticate a user to a customer profile in the customer profile database 404. The unique customer identifier may include a username and/or password, a cookie, or other identifier for authenticating the user. In addition to a unique customer identifier, the identifying information may include a device identifier and/or a device type that tracks whether a user operating the electronic device 306 or the A/V display interface 309 is actively logged in. The device identifier may include an IP address, a MAC address, or other unique identifier of the electronic device 306 or A/V display interface 309. The device type may include a type of device (e.g., television, Blu-Ray player, mobile device, etc.), brand, model number, or other information about the electronic device 306 or A/V display interface 309. The identifying information may be stored in an active device table. The active device table may be maintained by a supplemental information server 422. It is understood by those in the art that an IP address is a numerical label assigned to any device participating in a computer network that uses the Internet Protocol for communication. It is also understood by those in the art that a MAC address is a unique hexadecimal identifier assigned to a network interface of a device. The MAC address of the electronic device 306 or the A/V display interface 309, for example, may be associated with a customer profile that contains information regarding where to transmit the supplemental information.

The customer profile database 404 can contain information related to customers of the article dispensing machines 230, including name, mailing and billing addresses, email addresses, phone and mobile numbers, username, password, payment methods, rental history, purchase history, preferred article dispensing machines, movie and video game genre preferences, customizations, subscriptions, parental controls, linked content provider accounts, content provider subscriptions and entitlements, and other data. A rental transaction can be personalized using information from the customer profile database 404 at the article dispensing machines 230 and a website interface 418. For example, only certain genres and titles of DVDs, Blu-Ray discs, or video games could be shown if a customer sets particular preferences that are then stored in the customer profile database 404. Some of the information stored in the customer profile database 404 may also be stored in the article dispensing machine database 282. The customer profile database 404 may include a service which facilitates interfacing and communicating with a notification engine 406 and other components of the system backend 307, for example.

The website interface 418 can be interactive and accessible to a customer using web browser software at an electronic device 306. The website interface 418 may also include a mobile application or consumer electronics device application. Rentable media articles may be searched, browsed, and reserved on the website interface 418 for receipt at the article dispensing machines 230. The location of and the inventory at article dispensing machines 230 can be viewed at the website interface 418. Digital media selections from content providers, such as streaming, downloadable, and on-demand media, may also be searched, browsed, and accessed on the website interface 418. A customer can access their customer profile on the website interface 418 for purposes of verifying and updating their personal information in the customer profile database 404. For example, a customer can link an account they have with a content provider on the website interface 418 by specifying their username, password, account number, and/or other identifying information for the content provider account. The system backend 307 can utilize SAML (Security Assertion Markup Language), OAuth (Open Authentication), or other protocols to authenticate the identity of the customer at the content provider via a connection from the website interface 418 to the content provider identification and authentication controller 506 in the content provider backend 308, as shown in FIG. 5. If the identifying information matches the content provider account, the linkage to the content provider account can be stored in the customer profile database 404.

An inventory database 412 may contain a catalog of physical media articles that may be rented at the article dispensing machines 230 and reserved at the website interface 418 for later receipt at the article dispensing machines 230. A catalog of digital media selections available at the content provider can be contained in the metadata database 410. Metadata for the media articles and media selections are stored in the metadata database 410, including title, release date, running time, chapter information, technical details (resolution, audio options, languages, etc.), format, peripheral device requirements, number of players, online capability, actors, voice actors, director, studio, publisher, developer, platform, availability of downloadable content, episode information, genre, critic ratings, individualized ratings (reviews, recommendations, likes, etc.), parental ratings (MPAA, ESRB, TV Parental Guidelines, etc.), description, related content, media artwork, media stills, language, and other information.

Physical media articles that may be rented at the article dispensing machines 230 and digital media selections available at the content provider may be synchronized and mapped to one another by matching their respective metadata. As seen in FIG. 5, a synchronization and mapping engine 414 connected to the customer profile database 404, the metadata database 410, and the content provider asset management system 504 in the content provider backend 308 may compare the metadata for the media articles and media selections to determine matches. Metadata in the content provider asset management system 504 for media selections can be compared to metadata in the metadata database 410 to perform the matching. For example, a combination of a title, release date, running time, and/or actor information can be used to map a media article to a corresponding media selection. In one embodiment, proprietary identification codes unique to a media article and a media selection can be used to map the media article to the corresponding media selection. The proprietary identification codes for the media article and the media selection can be stored in the metadata database 410 and the content provider asset management system 504, respectively. Such proprietary identification codes can be assigned to media articles and media selections by third party providers such as Rovi, Baseline, and AMG.

Figure 6:
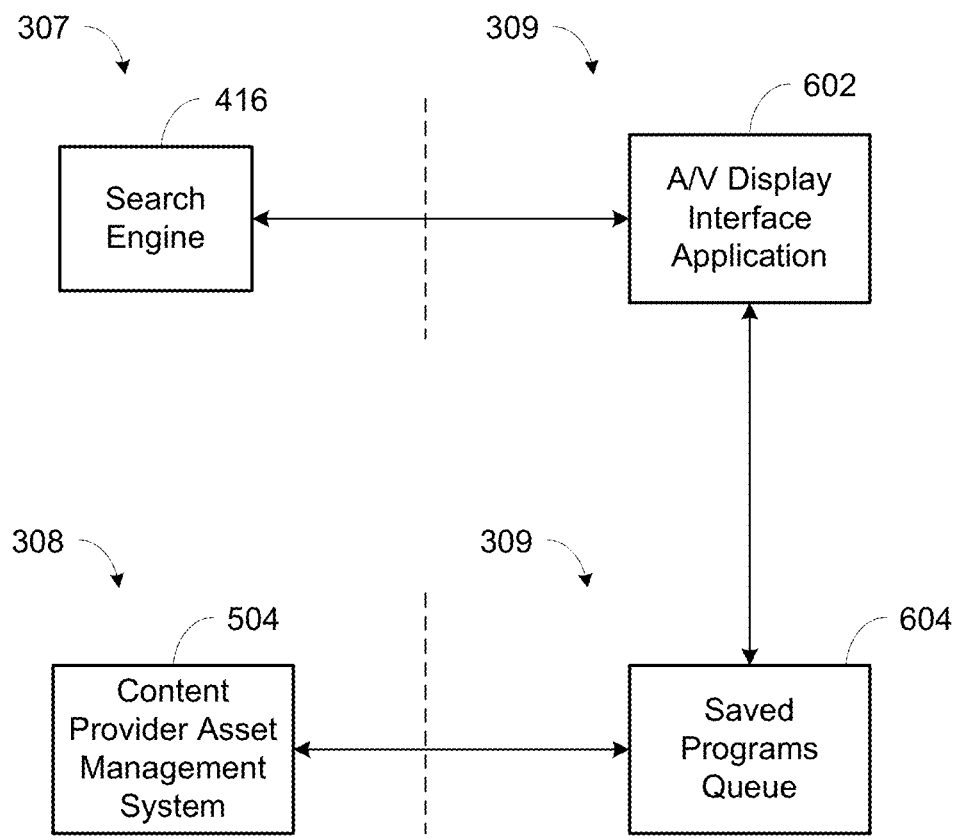
FIG. 6 is a block diagram illustrating connections between the system backend, the content provider backend, and the A/V display interface.

A media selection at a content provider can be placed in the saved programs queue 604 on the A/V display interface 309, as shown in FIG. 6, by providing the appropriate instructions to the content provider asset management system 504 in the content provider backend 308. Queuing a media selection may occur, for example, when a customer decides to purchase the digital media selection from the content provider in place of a physical media article at an article dispensing machine 230.

An inventory database 412 can be connected to the article dispensing machine 230 and the metadata database 410 to provide information regarding the availability of media articles in the article dispensing machines 230. In conjunction with a search engine 416, the inventory database 412 and the metadata database 410 can provide inventory results for media articles and media selections to an A/V display interface application 602 on an A/V display interface 309, as shown in FIG. 6. Such results may include the availability of physical media articles at the article dispensing machines 230 as well as digital media selections available at a content provider. The results may also be provided to the website interface 418 or other websites operated by a content provider, for example. The synchronization and mapping engine 414 can store the information from the content provider asset management system 504 regarding media selections at the content provider in the metadata database 410. The inventory database 412 can also supply the availability of media articles in the article dispensing machines 230 to the website interface 418 or to other portals, such as an application on a mobile device, when queried.

A metadata database watcher 408 can monitor the metadata database 410 for changes in metadata related to media articles and media selections. The metadata database watcher 408 can use customer watchlist subscriptions from a customer profile in the customer profile database 404 to determine what changes to monitor. The changes to the metadata can include inventory availability, content provider availability, release schedules, and other information related to a particular title. The customer watchlist subscriptions can be used by the metadata database watcher 408 to monitor these changes in combination with information regarding particular actors, directors, and/or other metadata. When a change corresponding to a customer watchlist subscription is found by the metadata database watcher 408, a notification engine 406 can transmit notifications and details of the change to the customer. The notifications may be sent via email, SMS, mobile application alerts, A/V display interface alerts, or other electronic channels.

A customer may also subscribe to be notified about new information and new media content related to their favorite actors, directors, titles, studios, and/or other parameters using customer notification subscriptions. Such information may include information related to live performances, television appearances, newspaper and magazine articles, blogs, and other content. A web crawler and data feed 420 can obtain this information by searching pertinent websites and through use of a public API connection to update the metadata database 410. The customer can subscribe to this information about their favorites at the website interface 418, for example. The metadata database watcher 408 monitoring the metadata database 410 can detect when there is a new piece of information about a favorite and transmit the desired notifications using the notification engine 406.

A supplemental information server 422 can be connected to the electronic device 306, the content provider backend 308, and the A/V display interface 309 to control and provide supplemental information to the electronic device 306 in synchronization with a piece of media content being played. The supplemental information may also be related to a current state of the piece of media content. In conjunction with the identification and authentication controller 402, the supplemental information server 422 may track whether the electronic device 306 and/or the A/V display interface 309 are actively logged in. The supplemental information server 422 may also receive notifications related to whether viewing of a piece of media content has started, stopped, paused, or resumed. Requests may also be received by the supplemental information server 422 from the electronic device 306 to start, stop, pause, or resume the piece of media content at the A/V display interface 309. Signals to start, stop, pause, or resume the piece of media content may also be transmitted indirectly to the A/V display interface 309 through the content provider backend 308. Applications may be installed and executed on the electronic device 306 and/or the A/V display interface 309 to facilitate providing the supplemental information. In one embodiment, an application may be present on a Blu-Ray disc and may be installed for execution on a Blu-Ray player when the Blu-Ray disc is played on the Blu-Ray player.

Figure 7:
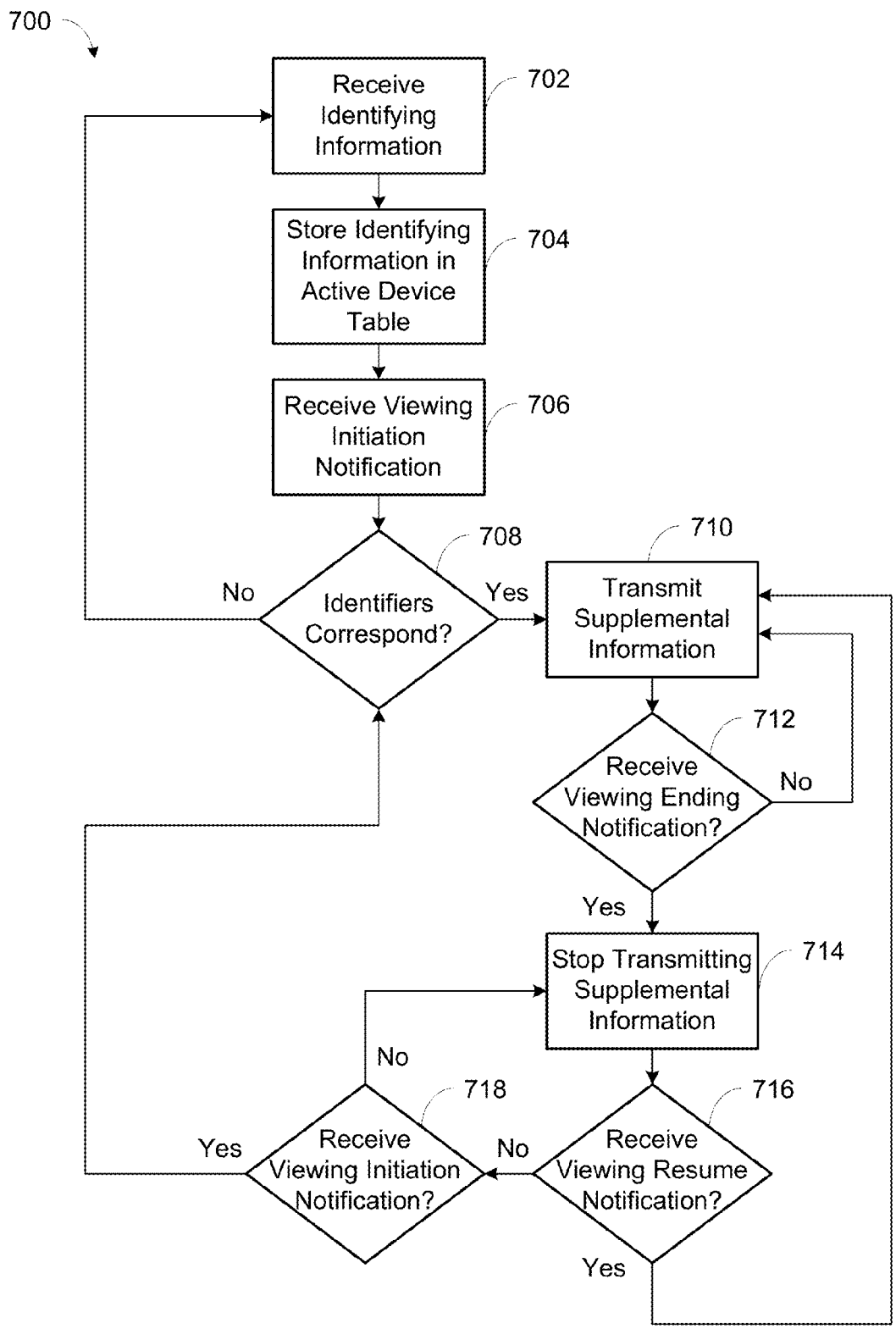
FIG. 7 is a flowchart illustrating operations for providing supplemental information related to a piece of media content that is initiated by receiving a viewing initiation notification.

An embodiment of a process 700 for providing supplemental information related to a piece of media content that is initiated by receiving a viewing initiation notification is shown in FIG. 7. The process 700 can result in the supplemental information server 422 transmitting supplemental information to an electronic device 306, where the supplemental information is synchronized with the piece of media content and is related to a current state of the piece of media content. The transmission of the supplemental information can be stopped, paused, and/or resumed using the process 700. Media content may include physical media articles, digital media selections, or live content (e.g., sports events, newscasts, television shows, etc.). The physical media articles may include media articles that are distributable from an article dispensing machine 230. The supplemental information transmitted to the electronic device 306 can include, for example, related metadata (e.g., trivia, filming details, interesting facts, relationships to other media content, etc.), magazine and news articles, blog postings, internet links, related or similar media content, transaction offers, sponsored information, advertisements, interactive or actionable advertisements, contextual information (e.g., sports statistics, localized weather, etc.), store availability, user-generated notations, etc. that are related to the piece of media content that is being played, as well as related to the current state of the piece of media content. In one embodiment, supplemental information created by one user, such as a user-generated notation related to a current state of the piece of media content, may be viewed by other users. The current state of the piece of media content may include an elapsed time, a chapter identification, a subtitle setting, a language setting, or other information that indicates the timeline and manner in which the piece of media content is being played.

Once the current state of the piece of media content being played is determined, the supplemental information server 422 can determine supplemental information that is relevant to a person, location, building, etc. currently being shown; music currently being played; specific dialogue being spoken; and other information in the piece of media content. As an example, if the piece of media content being played is a movie, the supplemental information may include a Wikipedia article about an actor that is currently showing at a particular point in the movie. As another example, the supplemental information may include a transaction offer to purchase a digital copy of a song that is currently playing at another point in the movie. As a further example, if the piece of media content being played is a live sports event, the supplemental information may include statistics of the players being shown. The supplemental information server 422 may retrieve the supplemental information from a memory or database that may be part of the central database 304, from the Internet, and/or from another memory or database at a remote location. The supplemental information may be derived from one or more sources.

At step 702, identifying information may be received at the identification and authentication controller 402. The identifying information can authenticate a user so that supplemental information is transmitted in synchronization with a piece of media content being played. Identifying information may be received from an electronic device 306 and/or an A/V display interface 309, and may include a unique customer identifier, a device identifier, and/or a device type, as discussed above. The identifying information from the electronic device 306 and the identifying information from the A/V display interface 309 may be received separately or at the same time. In some embodiments, only identifying information from the electronic device 306 may be needed to initiate transmission of the supplemental information. An embodiment of step 702 in the process 700 is discussed in more detail below in reference to the process 1100 shown in FIG. 11.

The identifying information may be stored by the supplemental information server 422 in an active device table at step 704. The active device table can track whether a user is logged in from the electronic device 306 and/or the A/V display interface 309. The active device table may be stored in the supplemental information server 422. Information in the active device table may be used at step 708, for example, to determine if the unique customer identifiers received from the electronic device 306 and the A/V display interface 309 correspond to one another. Information in the active device table may also be used to determine where to transmit the supplemental information, such as by using the IP address of the electronic device 306.

Figure 8:
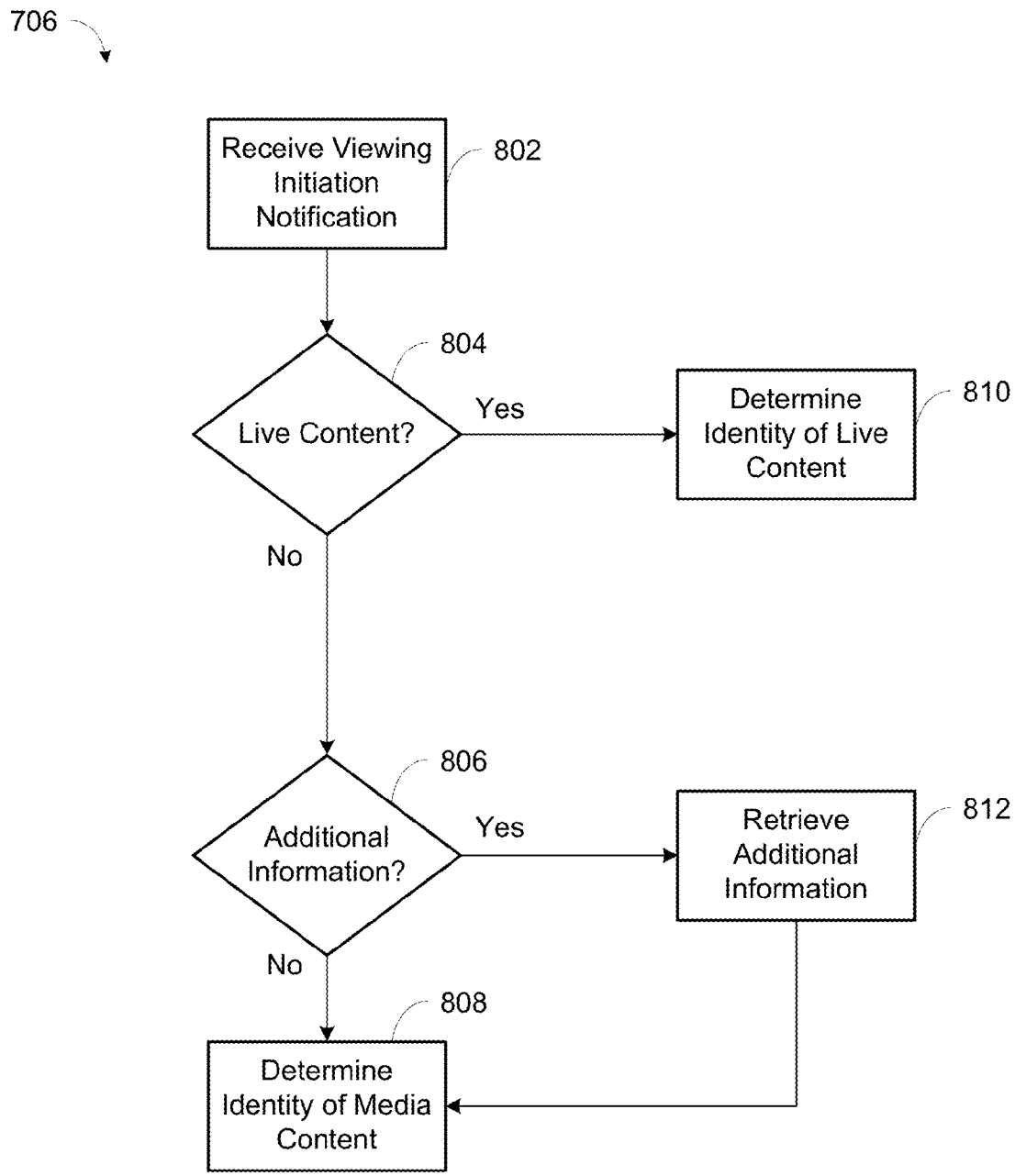
FIG. 8 is a flowchart illustrating operations for receiving the viewing initiation notification.

A viewing initiation notification may be received by the supplemental information server 422 at step 706 from the electronic device 306 or the A/V display interface 309. The viewing initiation notification can indicate that a piece of media content has started playing on the A/V display interface 309. An embodiment of step 706 in the process 700 is shown in FIG. 8. At step 802, the viewing initiation notification may be received at the supplemental information server 422. In one embodiment, the viewing initiation notification can be generated and transmitted automatically by the A/V display interface 309 when playing of the piece of media content has started. For example, a user can begin playback of a Blu-Ray disc on a Blu-Ray player by pressing the play button on the Blu-Ray player. As another example, the electronic device 306 may transmit an infrared or radio frequency signal to the Blu-Ray player to begin playback of a Blu-Ray disc. The Blu-Ray player may then generate and transmit a viewing initiation notification to the supplemental information server 422. In another embodiment, the viewing initiation notification can be transmitted manually from the electronic device 306 to indicate that the user has manually started play of the piece of media content. For example, a user may begin play of a digital video selection from a content provider and may simultaneously press a button on an application executing on the electronic device 306 to indicate that the digital video selection has begun playing.

At step 804, it may be determined by the supplemental information server 422 whether the piece of media content being played is live content. Live content may include media content that is currently being broadcast or aired, such as sports events, newscasts, television shows, etc. In this case, the viewing initiation notification may include a live content notification to inform the supplemental information server 422 that the piece of media content that is playing on the A/V display interface 309 is live content. If the piece of media content being played is determined to be live content at step 804, then the identity of the live content can be determined at step 810. The live content may be identified by the user by specifying the date, time, and/or channel of the live content, e.g., Jul. 1, 2011, 8 pm Central Daylight Time, NBC. The user may also identify the live content by specifying the name and/or episode of the live content, e.g., World Series Game 5, The Office: "Stress Relief". A user may further identify live content by specifying a network (e.g., CBS, Discovery Channel, etc.), studio (e.g., Sony Pictures Television, NBC Universal, etc.), the length of the programming (e.g., thirty minutes, two hours, etc.), and/or the status of the live content (e.g., new, repeat, special, etc.). The live content may also be identified automatically based on the audio or video of the live content, such as by using IntoNow, Shazam, or similar services. Automatic identification of the live content may also be performed based on the channel number the A/V display interface 309 is tuned to and/or the time and referencing an electronic program guide (EPG) database to identify the live content.

If the piece of media content is not determined to be live content at step 804, then the process 706 continues to step 806. At step 806, it can be determined whether additional information is available that is related to the piece of media content being played, such as metadata of the piece of media content or a transaction history of the user. The additional information may be transmitted with the viewing initiation notification at step 706. For example, metadata may be transmitted from the electronic device 306 and/or the A/V display interface 309 which is related to the piece of media content being viewed. The transaction history may include the metadata related to media content that the user has rented, purchased, downloaded, or streamed. The additional information may be used to determine the identity of the piece of media content. If additional information is available at step 806, then at step 812, the additional information is retrieved. For example, the transaction history of the user may be retrieved from the customer profile database 404, which may include the user's currently rented media articles (e.g., DVDs and/or Blu-Ray discs). The media articles may include media articles that are distributable from an article dispensing machine 230. Following step 812, or if no additional information is available at step 806, the process 706 continues to step 808.

At step 808, the identity of the piece of media content being played may be determined. If additional information was retrieved at step 812, the identity of the piece of media content may be determined at step 808 based on the additional information. For example, metadata such as a title or proprietary identification code of the DVD being played could be used to identify the piece of media content. As another example, the user could select from their currently rented media articles (based on their previously-retrieved transaction history) to confirm that the piece of media content being played is one of those media articles. As a further example, the piece of media content may be identified based on the audio or video of the piece of media content, such as by using IntoNow, Shazam, or similar services. The identity of the piece of media content may be used to determine the supplemental information to be transmitted later in the process 700. If additional information was not retrieved at step 812, the identity of the piece of media content being played may be determined at step 808 by manual input of the identity of the piece of media content by a user.

Returning to FIG. 7, the process 700 continues to step 708 where it can be determined by the supplemental information server 422 whether the unique customer identifiers in the active device table correspond to one another. As described above, one or more unique customer identifiers may be received as part of identifying information received at step 702. If both the electronic device 306 and the A/V display interface 309 have identifying information in the active device table, then the unique customer identifiers for the respective devices can be compared at step 708. The unique customer identifiers may correspond to one another if they match or are associated with each other. For example, if a first unique customer identifier received from an electronic device 306 and a second unique customer identifier received from an A/V display interface 309 are present in the same customer profile for a particular user, then the unique customer identifiers can be deemed to correspond to each other at step 708. If the active device table has only identifying information for the electronic device 306, e.g., in the case of a manual start of play of the piece of media content, the process 700 may continue to step 710. If the unique customer identifiers do not correspond at step 708, then the process 700 returns to step 702 where new or different identifying information may be received.

Following step 708, the process 700 continues to step 710 where the supplemental information related to the piece of media content being played can be transmitted from the supplemental information server 422 to the electronic device 306. The supplemental information may be synchronized with the piece of media content being played and may also be related to the current state of the piece of media content. The electronic device 306 may receive the supplemental information continuously, periodically, or intermittently while the piece of media content is being played. An embodiment of step 710 in the process 700 is discussed in more detail below in reference to the process 1200 shown in FIG. 12.

The supplemental information server 422 can determine at step 712 if a viewing ending notification has been received. A viewing ending notification may be received if the piece of media content being played at the A/V display interface 309 has been stopped or paused. The A/V display interface 309 may generate and transmit the viewing ending notification automatically if the piece of media content being played has been stopped or paused at the A/V display interface 309. The user may also transmit the viewing ending notification from the electronic device 306 if the piece of media content being played has been manually stopped or paused. If a viewing ending notification is not received at step 712, then the process 700 returns to step 710 and the supplemental information server 422 may continue transmitting the supplemental information to the electronic device 306.

However, if a viewing ending notification is received at step 712, then the transmission of the supplemental information may be stopped at step 714. Continuing to step 716, it can be determined if a viewing resumption notification has been received at the supplemental information server 422. A viewing resumption notification may be received if the piece of media content being played at the A/V display interface 309 has resumed. The A/V display interface 309 may generate and transmit the viewing resumption notification automatically if the piece of media content has been restarted or unpaused at the A/V display interface 309. The user may also transmit the viewing resumption notification from the electronic device 306 if the piece of media content has been manually restarted or unpaused. If a viewing resumption notification is received at step 716, then the process 700 returns to step 710 to restart transmission of the supplemental information from the supplemental information server 422 to the electronic device 306.

If a viewing resumption notification is not received at step 716, then the process 700 continues to step 718, where it is determined if a viewing initiation notification has been received at the supplemental information server 422. A viewing initiation notification may be received at this point in the process 700 if a new piece of media content is now being played. If a viewing initiation notification is received at step 718, then the process 700 returns to step 708 to determine whether the unique customer identifiers correspond to one another, as described above. However, if a viewing initiation notification is not received at step 718, then the process 700 returns to step 714 and continues not transmitting the supplemental information to the electronic device 306.

Figure 9:
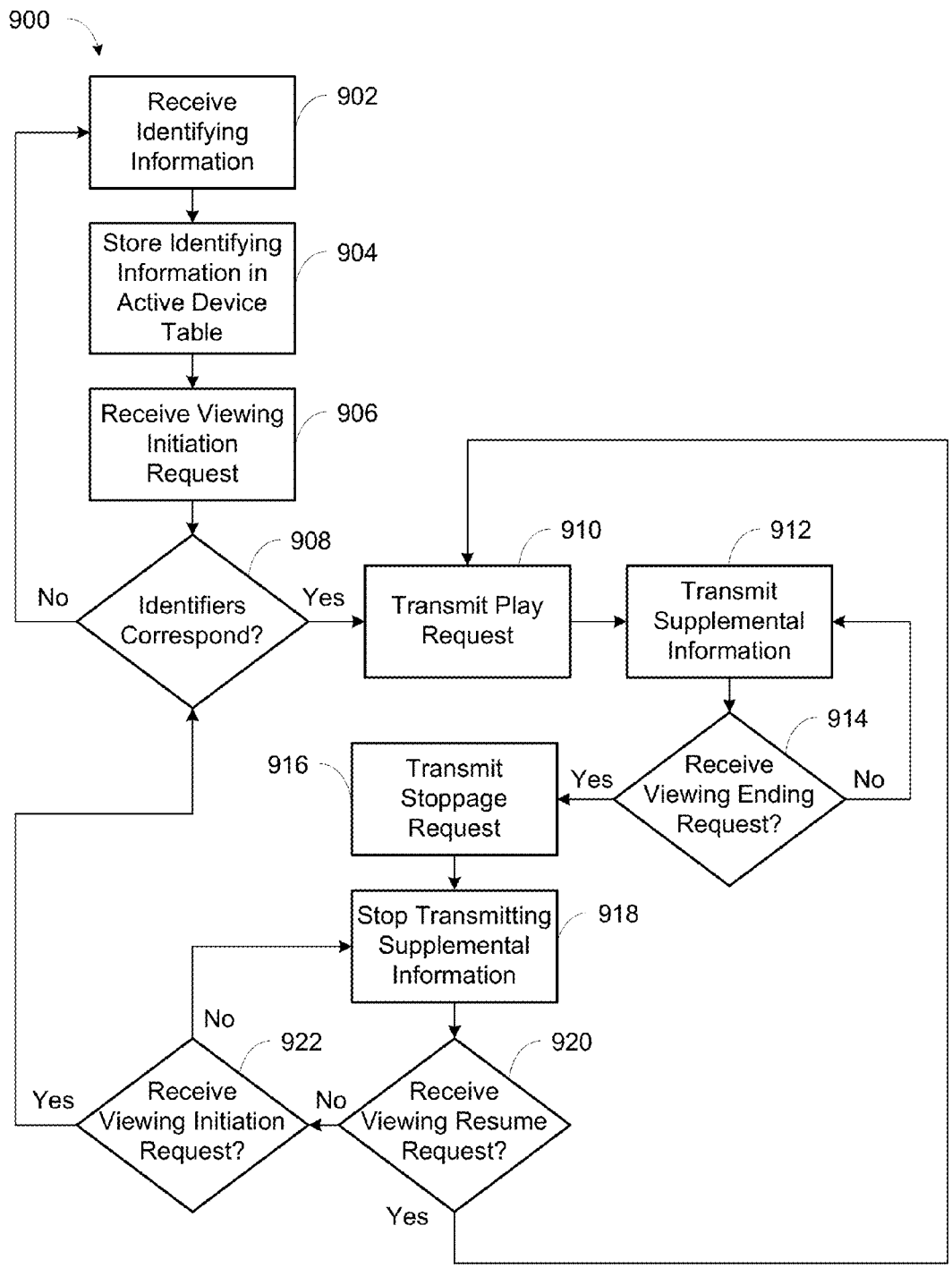
FIG. 9 is a flowchart illustrating operations for providing supplemental information related to a piece of media content that is initiated by receiving a viewing initiation request.

An embodiment of a process 900 for providing supplemental information related to a piece of media content that is initiated by receiving a viewing initiation request is shown in FIG. 9. The process 900 can result in the supplemental information server 422 transmitting supplemental information to an electronic device 306, where the supplemental information is synchronized with the piece of media content and is related to a current state of the piece of media content. The transmission of the supplemental information can be stopped, paused, and/or resumed using the process 900. Media content may include physical media articles, digital media selections, or live content. The supplemental information transmitted to the electronic device 306 can include, for example, metadata, magazine and news articles, blog postings, internet links, transaction offers, store availability, advertisements, etc. that are related to the piece of media content that is being played, as well as related to the current state of the piece of media content. The current state of the piece of media content may include an elapsed time, a chapter identification, a subtitle setting, a language setting, or other information that indicates the timeline and manner in which the piece of media content is being played.

Once the current state of the piece of media content being played is determined, the supplemental information server 422 can determine supplemental information that is relevant to a person, location, building, etc. currently being shown; music currently being played; specific dialogue being spoken; and other information in the piece of media content. The supplemental information server 422 may retrieve the supplemental information from a memory or database that may be part of the central database 304, from the Internet, or from another memory or database at a remote location.

At step 902, identifying information may be received at the identification and authentication controller 402. The identifying information can authenticate a user so that supplemental information is transmitted in synchronization with a piece of media content being played. Identifying information may be received from an electronic device 306 and an A/V display interface 309, and may include a unique customer identifier, a device identifier, and/or a device type, as discussed above. The identifying information from the electronic device 306 and the identifying information from the A/V display interface 309 may be received separately or at the same time. An embodiment of step 902 in the process 900 is discussed in more detail below in reference to the process 1100 shown in FIG. 11.

The identifying information may be stored by the supplemental information server 422 in an active device table at step 904. The active device table can track whether a user is logged in from the electronic device 306 and the A/V display interface 309. The active device table may be stored in the supplemental information server 422. Information in the active device table may be used at step 908, for example, to determine if the unique customer identifiers received from the electronic device 306 and the A/V display interface 309 correspond to one another. Information in the active device table may also be used to determine where to transmit the supplemental information, such as by using the IP address of the electronic device 306.

Figure 10:
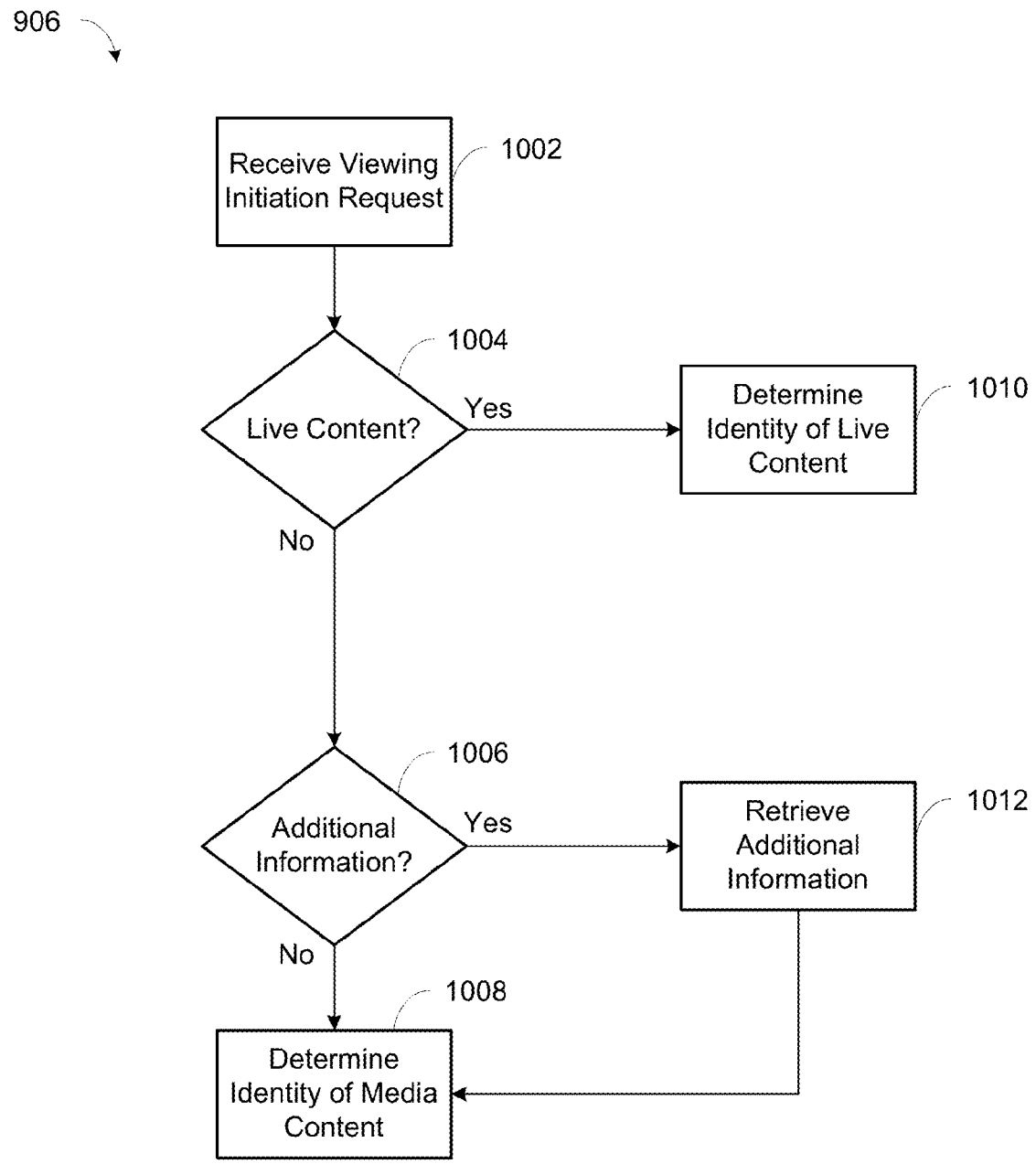
FIG. 10 is a flowchart illustrating operations for receiving the viewing initiation request.

A viewing initiation request may be received by the supplemental information server 422 at step 906 from the electronic device 306. The viewing initiation request can be a request to begin playing a piece of media content on the A/V display interface 309. An embodiment of step 906 in the process 900 is shown in FIG. 10. At step 1002, the viewing initiation request may be received at the supplemental information server 422 from the electronic device 306. In one embodiment, the viewing initiation request can be transmitted manually from the electronic device 306 to indicate that the user wishes to begin playing a piece of media content on the A/V display interface 309. For example, a user may wish to start playback of a Blu-Ray disc in a Blu-Ray player by pressing a play button on an application executing on the electronic device 306, rather than pressing the play button directly on the Blu-Ray player itself.

At step 1004, it may be determined by the supplemental information server 422 whether the piece of media content being played is live content, including media content that is currently being broadcast or aired. In this case, the viewing initiation request may include a live content notification to inform the supplemental information server 422 that the piece of media content that is being played at the A/V display interface 309 is live content. If the piece of media content being played is determined to be live content at step 1004, then the identity of the live content can be determined at step 1010. The live content may be identified by the user by specifying the date, time, and channel of the live content broadcast. The user may also identify the live content by specifying the name and/or episode of the live content. The live content may also be identified automatically based on the audio or video of the live content, such as by using IntoNow or similar services.

If the piece of media content is not determined to be live content at step 1004, then the process 906 continues to step 1006. At step 1006, it can be determined whether additional information is available that is related to the piece of media content being played, such as metadata of the piece of media content or a transaction history of the user. The additional information may be transmitted with the viewing initiation request at step 906. For example, metadata may be transmitted from the electronic device 306 and/or the A/V display interface 309 which is related to the piece of media content being viewed. The transaction history may include the metadata related to media content that the user has rented, purchased, downloaded, or streamed. The additional information may be used to determine the identity of the piece of media content. If additional information is available at step 1006, then at step 1012, the additional information is retrieved. For example, the transaction history of the user may be retrieved from the customer profile database 404, which may include the user's currently rented media articles. Following step 1012, or if no additional information is available at step 1006, the process 906 continues to step 1008.

At step 1008, the identity of the piece of media content being played may be determined. If additional information was retrieved at step 1012, the identity of the piece of media content may be determined at step 1008 based on the additional information. For example, metadata such as a title or proprietary identification code of the DVD being played could be used to identify the piece of media content. As another example, the user could select from their currently rented media articles (based on their previously-retrieved transaction history) to confirm that the piece of media content being played back is one of those media articles. The identity of the piece of media content may be used to determine the supplemental information to be transmitted later in the process 900. If additional information was not retrieved at step 1012, the identity of the piece of media content being played may be determined at step 1008 by manual input of the identity of the piece of media content by a user.

Returning to FIG. 9, the process 900 continues to step 908 where it can be determined by the supplemental information server 422 whether the unique customer identifiers in the active device table correspond to one another. As described above, unique customer identifiers may be received as part of identifying information received at step 902. The unique customer identifiers associated with the electronic device 306 and the A/V display interface 309 may be compared at step 908. The unique customer identifiers may correspond to one another if they match or are associated with each other. For example, if a first unique customer identifier received from an electronic device 306 and a second unique customer identifier received from an A/V display interface 309 are present in the same customer profile for a particular user, then the unique customer identifiers can be deemed to correspond to each other at step 908. If the unique customer identifiers do not correspond at step 908, then the process 900 returns to step 902 where new or different identifying information may be received.

Following step 908, the process 900 continues to step 910 to transmit a play request from the supplemental information server 422 to the A/V display interface 309. The A/V display interface 309 can begin playing the piece of media content in response to receiving the play request. The play request may also be indirectly transmitted to the A/V display interface 309 through the content provider backend 308. At step 912, the supplemental information related to the piece of media content being played can be transmitted to the electronic device 306. The supplemental information may be synchronized with the piece of media content being played and may also be related to the current state of the piece of media content. The electronic device 306 may receive the supplemental information continuously, periodically, or intermittently while the piece of media content is being played. An embodiment of step 912 in the process 900 is discussed in more detail below in reference to the process 1200 shown in FIG. 12.

The supplemental information server 422 can determine at step 914 if a viewing ending request has been received from the electronic device 306. A viewing ending request can be a request to stop or pause the play of a piece of media content on the A/V display interface 309. In particular, the user may transmit the viewing ending request from the electronic device 306 to indicate that the user wishes to stop or pause the play of the piece of media content. If a viewing ending request is not received at step 914, then the process 900 returns to step 912 and the supplemental information server 422 may continue transmitting the supplemental information to the electronic device 306.

However, if a viewing ending request is received at step 914, then a stoppage request may be transmitted at step 916 from the supplemental information server 422 to the A/V display interface 309. The A/V display interface 309 can stop or pause the play of the piece of media content in response to receiving the stoppage request. The stoppage request may also be indirectly transmitted to the A/V display interface 309 through the content provider backend 308. At step 918, the transmission of the supplemental information can be stopped from the supplemental information server 422. Continuing to step 920, it can be determined if a viewing resumption request has been received at the supplemental information server 422. A viewing resumption request may be received from the electronic device 306 to request resumption of the play of the piece of media content on the A/V display interface 309. The user may transmit the viewing resumption request from the electronic device 306 to indicate that the user wishes to restart or unpause the play of the piece of media content. If a viewing resumption request is received at step 920, then the process 900 returns to step 910 to transmit a play request to the A/V display interface 309. The play request may also be indirectly transmitted to the A/V display interface 309 through the content provider backend 308.

If a viewing resumption request is not received at step 920, then the process 900 continues to step 922, where it is determined if a viewing initiation request has been received at the supplemental information server 422. A viewing initiation request may be received at this point in the process 900 if the user wishes to begin playing a new piece of media content. If a viewing initiation request is received at step 922, then the process 900 returns to step 908 to determine whether the unique customer identifiers correspond to one another, as described above. However, if a viewing initiation request is not received at step 922, then the process 900 returns to step 918 and continues not transmitting the supplemental information to the electronic device 306.

Figure 11:
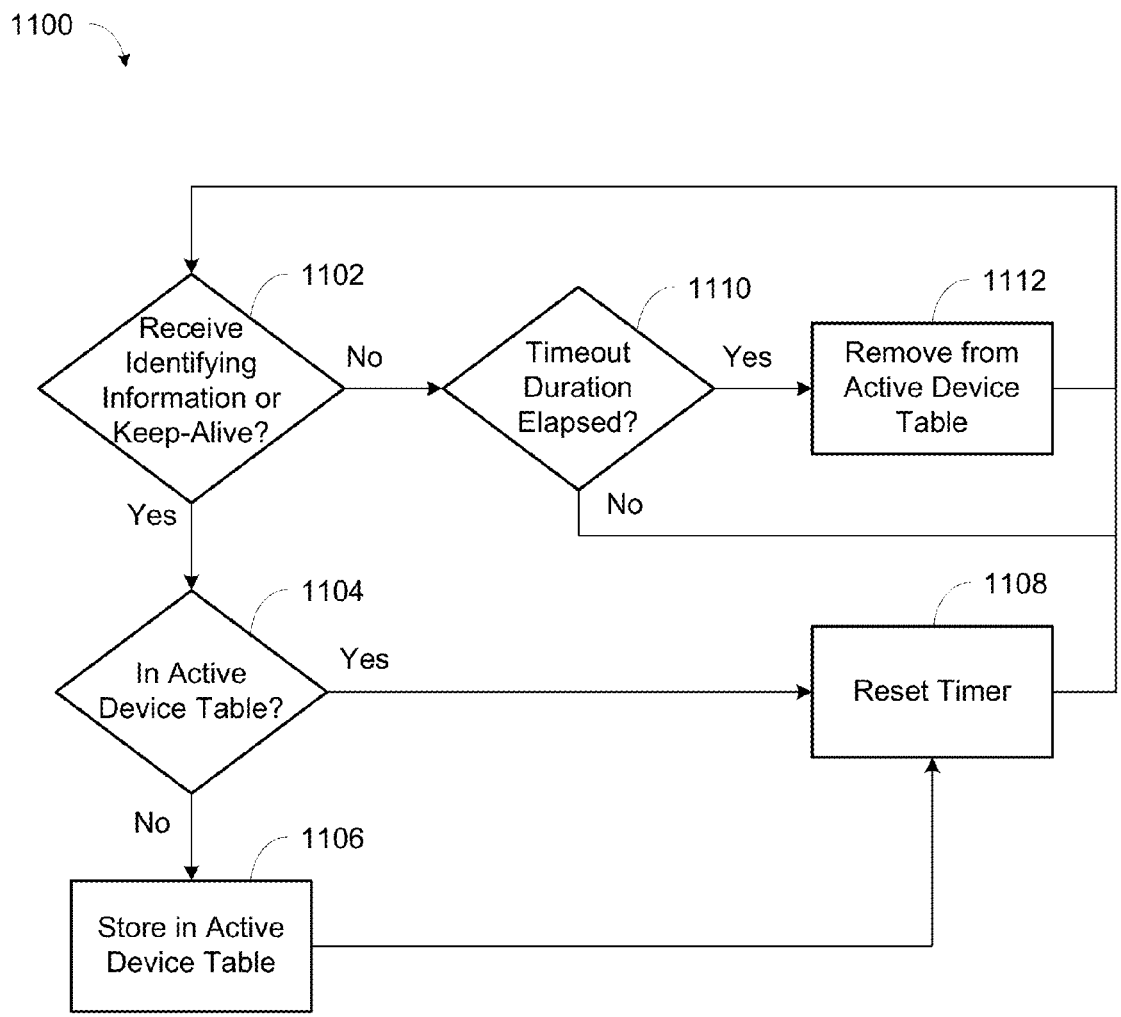
FIG. 11 is a flowchart illustrating operations for receiving identifying information from an electronic device and an audio/visual display interface.

An embodiment of a process 1100 for receiving identifying information from an electronic device 306 or A/V display interface 309 is shown in FIG. 11. The process 1100 may be implemented as part of step 702 of FIG. 7 or step 902 of FIG. 9. At step 1102, the supplemental information server 422 may determine whether identifying information or a keep-alive signal has been received from an electronic device 306 and/or an A/V display interface 309. As described above, identifying information may be received that includes a unique customer identifier, a device identifier, and/or a device type for the purposes of initiating display of supplemental information on an electronic device 306. A keep-alive signal may be periodically received at the supplemental information server 422 that indicates that the electronic device 306 or the A/V display interface 309 is still active and wants to continue to be logged into the supplemental information server 422. The keep-alive signal may include all or some of the identifying information in order to identify the electronic device 306 or the A/V display interface 309.

If identifying information or a keep-alive signal is received at step 1102, then the supplemental information server 422 may determine at step 1104 whether identifying information for the electronic device 306 or A/V display interface 309 is already present in the active device table. Identifying information for the electronic device 306 or A/V display interface 309 may already be present in the active device table if the electronic device 306 or A/V display interface 309 previously transmitted identifying information to the supplemental information server 422 and the identifying information has not been removed from the active device table. If identifying information for the electronic device 306 or A/V display interface 309 is already in the active device table at step 1104, then the pertinent identifying information is maintained in the active device table. In addition, at step 1108, a timer corresponding to the electronic device 306 or the A/V display interface 309 can be reset. The timer may be used at step 1110 to determine whether a predetermined timeout duration has elapsed, which can result in the removal of the identifying information from the active device table for the electronic device 306 or the A/V display interface 309. If identifying information for the electronic device 306 or A/V display interface 309 is not in the active device table at step 1104, then the identifying information can be stored in the active device table at step 1106. Following step 1106, the time corresponding to the electronic device 306 or the A/V display interface 309 can be reset at step 1108.

Returning to step 1102, if identifying information or a keep-alive signal is not received, then the process 1100 continues to step 1110 to determine whether a predetermined timeout duration has elapsed for the timer corresponding to the electronic device 306 and/or the A/V display interface 309. The predetermined timeout duration for the electronic device 306 and the A/V display interface 309 may be the same or different. The predetermined timeout duration may be used to determine whether too much time has elapsed since the supplemental information server 422 has received identifying information or a keep-alive signal from the electronic device 306 or the A/V display interface 309. If the predetermined timeout duration has elapsed at step 1110, then the identifying information for the electronic device 306 or the A/V display interface 309 may be removed from the active device table at step 1112. If the timeout duration has not elapsed at step 1110, then the process 1100 returns to step 1102 to determine if identifying information or a keep-alive signal has been received.

Figure 12:
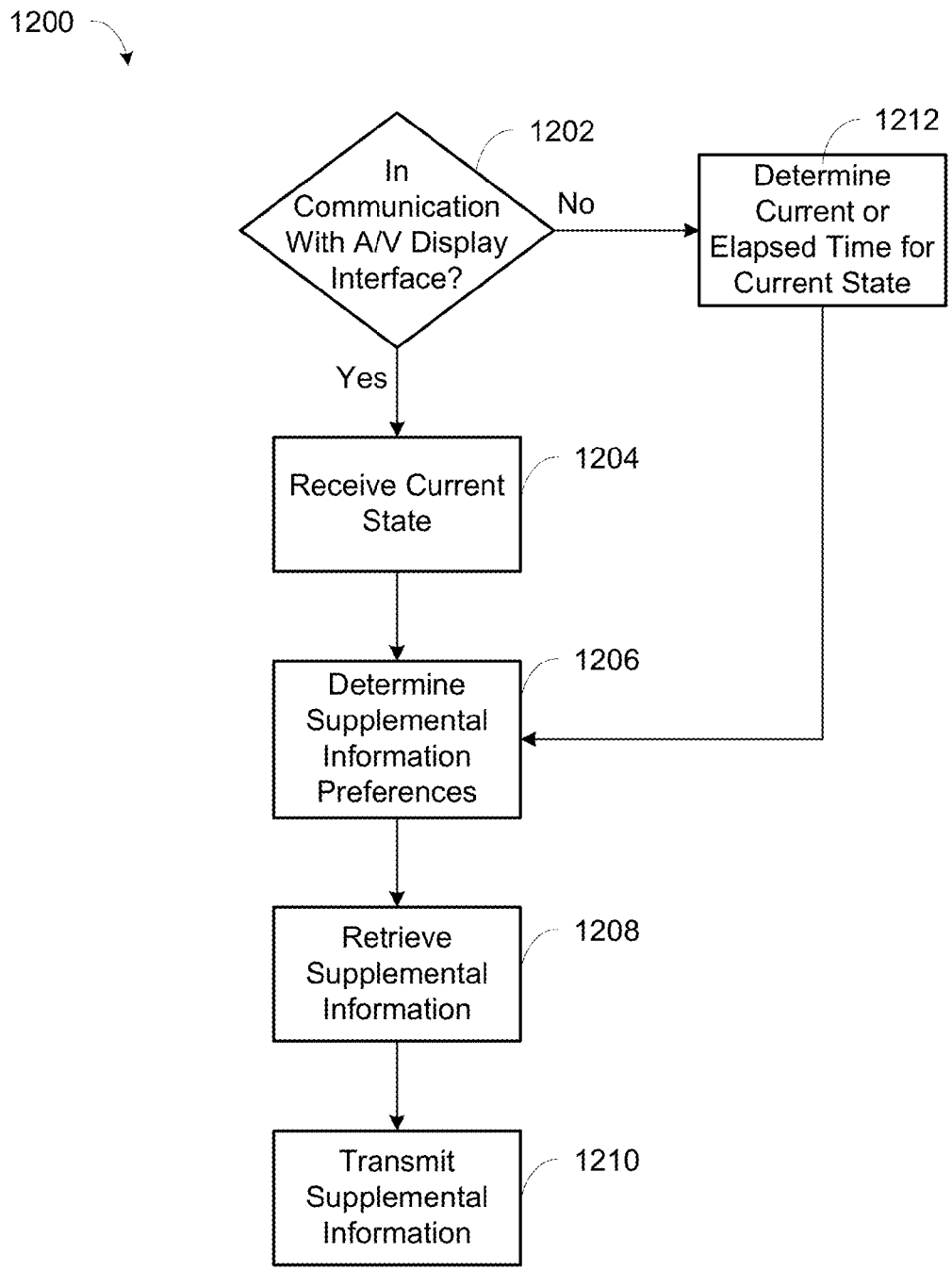
FIG. 12 is a flowchart illustrating operations for transmitting supplemental information.

An embodiment of a process 1200 for transmitting supplemental information to an electronic device 306 is shown in FIG. 12. The process 1200 may be implemented as part of step 710 of FIG. 7 or step 912 of FIG. 9. At step 1202, the supplemental information server 422 can determine whether it is in communication with the A/V display interface 309. An A/V display interface 309 may be able to communicate with the supplemental information server 422 if the A/V display interface 309 has network capability and the ability to receive and transmit data. For example, an A/V display interface 309 that can be in communication with the supplemental information server 422 may include a set-top box, a module of an internet-ready television, or a Blu-Ray player with internet connectability. If the A/V display interface 309 is determined to be in communication with the supplemental information server 422, then a current state of the piece of media content being played can be received at step 1204. The current state of the piece of media content may include an elapsed time, a chapter identification, a subtitle setting, a language setting, or other information that indicates the timeline and manner in which the piece of media content is being played. Supplemental information transmitted later in the process 1200 may be based on the current state of the piece of media content.

If the A/V display interface 309 is not in communication with the supplemental information server 422, then a current or elapsed time of the piece of media content being played may be determined at step 1212. The current or elapsed time may be used as the current state of the piece of media content being played for purposes of determining the supplemental information later in the process 1200. The current or elapsed time can be specified by the user at the electronic device 306. The elapsed time can be calculated by comparing the current time and the time when the piece of media content began playing. The current or elapsed time may be used by the supplemental information server 422 when the piece of media content is live content.

After the current state has been received or determined at step 1204 or step 1212, respectively, supplemental information preferences, if any, may be determined at step 1206. Supplemental information preferences may have been previously set by the user and stored in the customer profile, or may be set by the user at step 1206. The retrieval and transmission of the supplemental information to the electronic device 306 at steps 1208 and 1210 may be affected by the supplemental information preferences. The supplemental information preferences may include preferences by category, author, actor, director, genre, website, date, length, retailer (for items that can be purchased), social updates (filtered by a "friends" list), channel, studio, favorite team, location, rating, popularity, sales, or other preferences. For example, if a user indicates a preference to receive only blog postings related to the piece of media content being played, then the supplemental information retrieved and transmitted will only include blog postings. As another example, if the supplemental information preferences include a preference for sports-related information, then the supplemental information retrieved and transmitted will only include information related to sports, and would not include information related to business, for example.

Following step 1206, the process 1200 continues to step 1208 to retrieve the supplemental information. The supplemental information server 422 may retrieve the supplemental information from a memory or database that may be part of the central database 304, from the Internet, or from another memory or database at a remote location. The retrieved supplemental information may be transmitted to the electronic device 306 at step 1210. The supplemental information server 422 may transmit the supplemental information to the electronic device 306 based on the device identifier, e.g., an IP address, which is stored in the active device table. The supplemental information transmitted to the electronic device 306 can include, for example, metadata, magazine and news articles, blog postings, internet links, transaction offers, advertisements, etc. that are related to the piece of media content that is being played, as well as related to the current state of the piece of media content. The supplemental information may be displayed on the electronic device 306 as an email, an SMS message, as an alert, in an application executing on the electronic device 306, or other forms of communication. A uniform resource locator (URL) link may be included in the supplemental information.

Any process descriptions or blocks in figures should be understood as representing modules, segments, or portions of code which include one or more executable instructions for implementing specific logical functions or steps in the process, and alternate implementations are included within the scope of the embodiments of the present invention in which functions may be executed out of order from that shown or discussed, including substantially concurrently or in reverse order, depending on the functionality involved, as would be understood by those having ordinary skill in the art.

It should be emphasized that the above-described embodiments of the present invention, particularly, any "preferred" embodiments, are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and the present invention and protected by the following claims.

The invention claimed is:

1. A method of providing supplemental information related to a piece of media content comprising live media content, the method comprising:
   receiving first identifying information at a processor from a first electronic device, the first identifying information comprising a first unique customer identifier;
   storing the first identifying information in an active device table;
   receiving second identifying information at the processor from a second electronic device, the second identifying information comprising a second unique customer identifier wherein the second unique customer identifier has previously been associated with the customer;
   storing the second identifying information in the active device table;
   comparing the first and second identifying information to one another;
   receiving a viewing initiation notification at the processor, the viewing initiation notification comprising a live content notification from one or more of the first electronic device or the second electronic device, the live content notification indicating that viewing of the live media content has started on the second electronic device;
   in response to receiving the live content notification, determining an identification of the live media content;

determining the current state of the live media content based on the identification; and in response to determining the current state of the live media content and a determination that the first unique customer identifier corresponds to the second unique customer identifier:

retrieving the supplemental information, based on the identification and the current state of the live media content; and transmitting the supplemental information from the processor to the first electronic device in synchronization with the live media content being played, wherein the supplemental information is related to the current state of the live media content.

2. The method of claim 1, wherein:

the current state comprises an elapsed time of the piece of media content being played; and transmitting comprises:

retrieving the supplemental information, based on the elapsed time; and transmitting the supplemental information to the first electronic device.

3. The method of claim 1, wherein transmitting comprises:

receiving the current state of the piece of media content being played from the second electronic device, wherein the current state comprises one or more of an elapsed time, a chapter identification, a subtitle setting, or a language setting;

retrieving the supplemental information, based on the current state; and transmitting the supplemental information to the first electronic device.

4. The method of claim 1, wherein receiving the viewing initiation notification comprises:

receiving metadata for identifying the piece of media content; and determining an identification of the piece of media content based on the metadata.

5. The method of claim 4, wherein the metadata comprises at least one of a title, a release date, a running time, chapter information, technical details, a format, a peripheral device requirement, number of players, online capability, an actor, a voice actor, a director, a studio, a publisher, a developer, a platform, availability of downloadable content, episode information, a genre, a critic rating, an individualized rating, a parental rating, a description, related content, media artwork, a media still, language, or a proprietary identification code.

6. The method of claim 1:

wherein receiving the viewing initiation notification comprises:

retrieving a transaction history from a customer profile database in communication with the processor; and determining an identification of the piece of media content based on the transaction history; and wherein transmitting comprises:

retrieving the supplemental information, based on the identification; and transmitting the supplemental information to the first electronic device.

7. The method of claim 1, wherein:

receiving the first identifying information comprises:

periodically receiving a first keep-alive signal from the first electronic device; and maintaining the first identifying information in the active device table, in response to the first keep-alive signal; and receiving the second identifying information comprises:

periodically receiving a second keep-alive signal from the second electronic device; and maintaining the second identifying information in the active device table, in response to the second keep-alive signal.

8. The method of claim 7, further comprising:

removing the first identifying information from the active device table, if the first keep-alive signal is not received from the first electronic device within a first predetermined duration; and removing the second identifying information from the active device table, if the second keep-alive signal is not received from the first electronic device within a second predetermined duration.

9. The method of claim 7, wherein:

the first keep-alive signal comprises the first identifying information; and the second keep-alive signal comprises the second identifying information.

10. The method of claim 1, wherein the first identifying information and the second identifying information each comprise a device identifier and a device type.

11. The method of claim 10, wherein the device identifier comprises one or more of an IP address or a MAC address.

12. The method of claim 1, wherein receiving the viewing initiation notification comprises receiving the viewing initiation notification at the processor from the second electronic device.

13. The method of claim 1, wherein receiving the viewing initiation notification comprises receiving the viewing initiation notification at the processor from the first electronic device, wherein the viewing initiation notification indicates that the piece of media content has been manually started on the second electronic device.

14. The method of claim 1, further comprising:

receiving a viewing ending notification at the processor, the viewing ending notification indicating stoppage of the piece of media content being played on the second electronic device; and in response to receiving the viewing ending notification, stopping transmission of the supplemental information to the first electronic device.

15. The method of claim 14, wherein the viewing ending notification comprises one or more of a pause or a stop of the piece of media content being played at the second electronic device.

16. The method of claim 14, further comprising:

receiving a viewing resumption notification, the viewing resumption notification indicating that the piece of media content has resumed playing on the second electronic device, and in response to receiving the viewing resumption notification, restarting transmission of the supplemental information to the first electronic device.

17. The method of claim 1, wherein transmitting comprises:

retrieving a supplemental information preference; and transmitting the supplemental information to the first electronic device in accordance with the supplemental information preference.

18. The method of claim 1, wherein the first electronic device comprises one or more of a personal computer, a mobile device, a tablet computer, a video game console, a television, or a Blu-Ray player.

19. The method of claim 1, wherein the second electronic device comprises one or more of a set-top box, a module of an internet-ready television, a Blu-Ray player with internet connectability, a software application executing on a mobile device, a cable television converter box, a satellite television set-top box, an Internet Protocol television set-top box, a digital video recorder, a tablet computer, a video game console, a handheld gaming device, a laptop computer, a desktop computer, or a streaming media box.

20. The method of claim 1, wherein the piece of media content comprises one or more of a media article or a media selection, wherein the media article comprises at least one of a digital video disc, a Blu-Ray disc, or a video game, and the media selection comprises at least one of a video on demand, a streaming video, a downloadable video, a streaming video game, or a downloadable video game.

21. A method of providing supplemental information related to a piece of media content comprising live media content, the method comprising:
    receiving first identifying information at a processor from an electronic device, the first identifying information comprising a first unique customer identifier;
    storing the first identifying information in an active device table;
    receiving second identifying information at the processor from an audio/visual display interface, the second identifying information comprising a second unique customer identifier wherein the second unique customer identifier has previously been associated with the customer; and
    storing the second identifying information in the active device table;
    comparing the first and second identifying information to one another;
    receiving a viewing initiation request at the processor from the electronic device, the viewing initiation request comprising a live content notification from one or more of the electronic device or the audio/visual display interface, the live content notification indicating a request to begin play of the live media content on the audio/visual display interface;
    transmitting a play request to the audio/visual display interface, in response to the viewing initiation request;
    in response to receiving the live content notification, determining an identification of the live media content;
    determining the current state of the live media content based on the identification; and
    in response to determining the current state of the live media content and a determination that the first unique customer identifier corresponds to the second unique customer identifier:
        retrieving the supplemental information, based on the identification and the current state of the live media content; and
        transmitting the supplemental information from the processor to the electronic device in synchronization with the live media content being played, wherein the supplemental information is related to the current state of the live media content.

22. The method of claim 21, wherein:
    the current state comprises an elapsed time of the piece of media content being played; and
    transmitting the supplemental information comprises:
        retrieving the supplemental information, based on the elapsed time; and
        transmitting the supplemental information to the electronic device.

23. The method of claim 21, wherein transmitting the supplemental information comprises:
    receiving the current state of the piece of media content being played from the audio/visual display interface, wherein the current state comprises one or more of an elapsed time, a chapter identification, a subtitle setting, or a language setting;
    retrieving the supplemental information, based on the current state; and
    transmitting the supplemental information to the electronic device.

24. The method of claim 21, wherein receiving the viewing initiation request comprises:
    receiving metadata for identifying the piece of media content; and
    determining an identification of the piece of media content based on the metadata.

25. The method of claim 21:
    wherein receiving the viewing initiation request comprises:
        retrieving a transaction history from a customer profile database in communication with the processor; and
        determining an identification of the piece of media content based on the transaction history; and
    wherein transmitting the supplemental information comprises:
        retrieving the supplemental information, based on the identification; and
        transmitting the supplemental information to the electronic device.

26. The method of claim 21, wherein:
    receiving the first identifying information comprises:
        periodically receiving a first keep-alive signal from the electronic device; and
        maintaining the first identifying information in the active device table, in response to the first keep-alive signal; and
    receiving the second identifying information comprises:
        periodically receiving a second keep-alive signal from the audio/visual display interface; and
        maintaining the second identifying information in the active device table, in response to the second keep-alive signal.

27. The method of claim 26, further comprising:
    removing the first identifying information from the active device table, if the first keep-alive signal is not received from the electronic device within a first predetermined duration, and
    removing the second identifying information from the active device table, if the second keep-alive signal is not received from the electronic device within a second predetermined duration.

* * * * *